US009491793B2

(12) United States Patent
Pelletier et al.

(10) Patent No.: US 9,491,793 B2
(45) Date of Patent: *Nov. 8, 2016

(54) COMPONENT CARRIER ACTIVATION/DEACTIVATION IN MULTI CARRIER SYSTEMS

(71) Applicant: INTERDIGITAL PATENT HOLDINGS, INC., Wilmington, DE (US)

(72) Inventors: Ghyslain Pelletier, Laval (CA); Paul Marinier, Brossard (CA); Marian Rudolf, Montreal (CA); Stephen E Terry, Northport, NY (US); Robert L Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,801

(22) Filed: Oct. 24, 2014

(65) Prior Publication Data

US 2015/0092713 A1   Apr. 2, 2015

Related U.S. Application Data

(63) Continuation of application No. 12/950,622, filed on Nov. 19, 2010, now Pat. No. 8,917,605.

(60) Provisional application No. 61/262,810, filed on Nov. 19, 2009, provisional application No. 61/293,520, (Continued)

(51) Int. Cl.
*H04W 4/00* (2009.01)
*H04W 76/02* (2009.01)
(Continued)

(52) U.S. Cl.
CPC .......... *H04W 76/025* (2013.01); *H04L 5/0098* (2013.01); *H04W 24/10* (2013.01); *H04W 52/365* (2013.01); *H04W 72/0406* (2013.01); *H04L 5/001* (2013.01); *H04W 52/34* (2013.01)

(58) Field of Classification Search
CPC ..... H04W 72/04; H04W 4/00; H04W 36/00; H04W 76/025; H04W 52/365; H04W 24/10; H04W 72/0406
USPC ...................................... 370/252, 236, 395.3
See application file for complete search history.

(56) References Cited

U.S. PATENT DOCUMENTS

2006/0280142 A1   12/2006   Damnjanovic et al.
2009/0238144 A1 *  9/2009   Cave ................ H04W 36/0055
                                                      370/331

(Continued)

FOREIGN PATENT DOCUMENTS

CN        101507332     8/2009
RU        2007146770    6/2009
WO    WO-2008/024340 A2  2/2008

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.1.0, Sep. 2010, 192 pages.

(Continued)

*Primary Examiner* — Sai-Ming Chan
(74) *Attorney, Agent, or Firm* — Julian F. Santos

(57) ABSTRACT

Methods and apparatus for addressing wireless transmit/receive unit (WTRU) behavior in response to configuration, configuration parameters and access issues related to the activation/deactivation process when the WTRU may be configured with multiple serving cells or carrier aggregation.

32 Claims, 3 Drawing Sheets

Related U.S. Application Data filed on Jan. 8, 2010, provisional application No. 61/304,149, filed on Feb. 12, 2010, provisional application No. 61/307,803, filed on Feb. 24, 2010, provisional application No. 61/314,446, filed on Mar. 16, 2010, provisional application No. 61/330,150, filed on Apr. 30, 2010, provisional application No. 61/355,756, filed on Jun. 17, 2010, provisional application No. 61/373,678, filed on Aug. 13, 2010.

(51) Int. Cl.

| | |
|---|---|
| H04W 52/36 | (2009.01) |
| H04L 5/00 | (2006.01) |
| H04W 24/10 | (2009.01) |
| H04W 72/04 | (2009.01) |
| H04W 52/34 | (2009.01) |

(56) References Cited

U.S. PATENT DOCUMENTS

| | | | |
|---|---|---|---|
| 2010/0291956 | A1 | 11/2010 | Iwamura et al. |
| 2011/0021197 | A1* | 1/2011 | Ngai ............................. 455/436 |
| 2012/0281633 | A1* | 11/2012 | Kim ................... H04W 52/367 370/328 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.10.0, Sep. 2009, 147 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.12.0, Mar. 2010, 149 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300 V9.1.0, Sep. 2009, 165 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300 V9.5.0, Sep. 2010, 173 pages.
"3rd Generation Partnership Project; Technical Specification Group Radio Access Network; Evolved Universal Terrestrial Radio Access (E-UTRA); Medium Access Control (MAC) protocol specification (Release 8)", 3GPP TS 36.321 V8.9.0, Jun. 2010, 47 pages.
"3rd Generation Partnership Project; Technical Specification Group Radio Access Network; Evolved Universal Terrestrial Radio Access (E-UTRA); Medium Access Control (MAC) protocol specification (Release 8)", 3GPP TS 36.321 V8.7.0, Sep. 2009, 47 pages.
"3rd Generation Partnership Project; Technical Specification Group Radio Access Network; Evolved Universal Terrestrial Radio Access (E-UTRA); Medium Access Control (MAC) protocol specification (Release 9)", 3GPP TS 36.321 V9.0.0, Sep. 2009, 47 pages.
"3rd Generation Partnership Project; Technical Specification Group Radio Access Network; Evolved Universal Terrestrial Radio Access (E-UTRA); Medium Access Control (MAC) protocol specification (Release 9)", 3GPP TS 36.321 V9.3.0, Jun. 2010, 48 pages.
"3rd Generation Partnership Project; Technical Specification Group Radio Access Network; Evolved Universal Terrestrial Radio Access (E-UTRA); Multiplexing and Channel Coding (Release 8)", 3GPP TS 36.212 V8.8.0, Dec. 2012, 60 pages.
"3rd Generation Partnership Project; Technical Specification Group Radio Access Network; Evolved Universal Terrestrial Radio Access (E-UTRA); Multiplexing and Channel Coding (Release 8)", 3GPP TS 36.212 V8.7.0, May 2009, 60 pages.
"3rd Generation Partnership Project; Technical Specification Group Radio Access Network; Evolved Universal Terrestrial Radio Access (E-UTRA); Multiplexing and Channel Coding (Release 9)", 36.213 V9.3.0, Sep. 2010, 80 pages.
"3rd Generation Partnership Project; Technical Specification Group Radio Access Network; Evolved Universal Terrestrial Radio Access (E-UTRA); Physical layer procedures (Release 8)", 3GPP TS 36.213 V8.8.0, Sep. 2009, 77 pages.
"3rd Generation Partnership Project; Technical Specification Group Radio Access Network; Evolved Universal Terrestrial Radio Access (E-UTRA); Radio Resource Control (RCC); Protocol Specification (Release 8)", 3GPP TS 36.331 V8.7.0, Sep. 2009, 208 pages.
"3rd Generation Partnership Project; Technical Specification Group Radio Access Network; Evolved Universal Terrestrial Radio Access (E-UTRA); Radio Resource Control (RCC); Protocol Specification (Release 8)", 3GPP TS 36.331 V8.11.0, Sep. 2010, 212 pages.
"3rd Generation Partnership Project; Technical Specification Group Radio Access Network; Evolved Universal Terrestrial Radio Access (E-UTRA); Radio Resource Control (RCC); Protocol Specification (Release 9)", 3GPP TS 36.331 V9.0.0, Sep. 2009, 213 pages.
"3rd Generation Partnership Project; Technical Specification Group Radio Access Network; Evolved Universal Terrestrial Radio Access (E-UTRA); Radio Resource Control (RCC); Protocol Specification (Release 9)", 3GPP TS 36.331 V9.4.0, Sep. 2010, 252 pages.
"Japanese Notice of Rejection", Japanese Patent Application No. 2012-540094, Aug. 6, 2013, 3 pages.
"Japanese Notice of Rejection (English Translation)", Japanese Patent Application No. 2012-540094, Aug. 6, 2013, 3 pages.
"United States Non-Final Office Action", U.S. Appl. No. 12/950,622, Mar. 27, 2013, 31 pages.
Alcatel-Lucent, "Carrier Aggregation", 3GPP Tdoc R2-095888, 3GPP TSG-RAN WG2 Meeting #67bis, Miyazaki, Japan, Oct. 24-28, 2009, 5 pages.
Alcatel-Lucent, "Component carrier indication for bandwidth extension in LTE-A", 3GPP Tdoc R1-093362, 3GPP TSG-RAN WG1 #58, Shenzhen, China, Aug. 24-28, 2009, 5 pages.
Catt, "Carrier activation and de-activation", 3GPP Tdoc R2-096502, 3GPP TSG-RAN WG2 #68, Jeju, Korea, Nov. 9-13, 2009, 3 pages.
Ericsson, et al., "Activation and deactivation of component carriers", 3GPP Tdoc R2-096752, 3GPP TSG-RAN WG2 #68, Jeju, Korea, Oct. 9-13, 2009, 4 pages.
Ericsson, "Impact of Carrier Aggregation on the L2 protocol architecture", 3GPP Tdoc R2-092957, 3GPP TSG-RAN WG2 #66, San Francisco, USA, May 4-8, 2009, 8 pages.
Ericsson, "Introduction of Carrier Aggregation", 3GPP Tdoc R2-106133, 3GPP TSG-RAN2 Meeting #72, Jacksonville, USA, Nov. 15-19, 2010, 53 pages.
HT MMOBILE, Inc, "Discussion on Scheduling and Priority handling for Carrier Aggregation", 3GPP Tdoc R2-100574, 3GPP TSG RAN WG2 Meeting #68bis, Valencia, Spain, Jan. 18-22, 2010, 2 pages.
Interdigital, "Separate SCell (De)Activation with LTE CA", 3GPP Tdoc R2-103773, 3GPP TSG-RAN WG2 #70bis, Stockholm, Sweden, Jun. 28-Jul. 2, 2010, 4 pages.
Interdigital Communications, "Activation/Deactivation MAC Control Element", 3GPP Tdoc R2-105708, 3GPP TSG-RAN WG2 #71bis, Xian, China, Oct. 11-15, 2010, 5 pages.
Interdigital Communications, "Activation/Deactivation MAC Control Element for LTE CA", 3GPP Tdoc R2-104817, 3GPP TSG-RAN WG2 #71, Madrid, Spain, Aug. 23-27, 2010, 9 pages.
Interdigital Communications, "Editorial proposal to CA MAC CR for activation/deactivation", 3GPP Tdoc R2-105704, 3GPP TSG-RAN WG2 #71bis, Xian, Peoples Republic of China, Oct. 11-15, 2010, 2 pages.
Interdigital Communications, "Editorial proposals to the CA MAC CR", 3GPP Tdoc R2-105705, 3GPP TSG-RAN WG2 #71bis, Xian, Peoples Republic of China, Oct. 11-15, 2010, 14 pages.
Interdigital Communications, "Editorial proposals to the CA RRC CR", 3GPP Tdoc Tdoc R2-105707, 3GPP TSG-RAN WG2 #71bis, Xian, Peoples Republic of China, Oct. 11-15, 2010, 12 pages.

(56) References Cited

OTHER PUBLICATIONS

Interdigital Communications, "Explicit Uplink SCC Deactivation in LTE CA", 3GPP Tdoc Tdoc R2-104816, 3GPP TSG-RAN WG2 #71, Madrid, Spain, Aug. 23-27, 2010, 4 pages.
Interdigital Communications, "Radio Link Monitoring on SCells", 3GPP Tdoc R2-106416, 3GPP TSG-RAN WG2 #72, Jacksonville, USA, Nov. 15-19, 2010, 3 pages.
Interdigital Communications, "Report of e-mail discussion [71#56] Enabling/Disabling of UL functionality", 3GPP Tdoc Tdoc R2-105703, 3GPP TSG-RAN WG2 Meeting #71bis, Xian, China, Oct. 11-15, 2010, 16 pages.
Interdigital Communications, "Report of PUCCH Resources and Removal of SCell Configuration", 3GPP Tdoc R2-104814, 3GPP TSG-RAN WG2 #71, Madrid, Spain, Aug. 23-27, 2010, 13 pages.
Interdigital Communications, "TAT expiry and D-SR failure", 3GPP Tdoc R2-105754, 3GPP TSG-RAN WG2 #71bis, Xian, Peoples Republic of China, Oct. 11-15, 2010, 5 pages.
Interdigital Communications, "UE Actions TAT Expiration with LTE CA", 3GPP Tdoc R2-103774, 3GPP TSG-RANWG2 #7bis, Stockholm, Sweden, Jun. 28-Jul. 2, 2010, 4 pages.
LG Electronics, Inc., "Configuration and activation of carrier indicator field in PDCCH for multiple carrier aggregation", 3GPP Tdoc R1-094468, 3GPP TSG RAN WG1 #59, Jeju, Korea, Nov. 9-13, 2009, 6 pages.
LG Electronics, Inc., "De-activation/Re-activation of Secondary Carrier", 3GPP Tdoc R2-096879, 3GPP TSG RAN WG2 Meeting #68, Jeju, South Korea, Nov. 9-13, 2009, 2 pages.
LG Electronics, Inc., "Logical Channel Prioritization for Aggregated Carriers", 3GPP Tdoc R2-100095, 3GPP TSG-RAN2 Meeting #68bis, Valencia, Spain, Jan. 18-22, 2010, 3 pages.
LG Electronics, Inc., "Logical Channel Prioritization for Aggregated Carriers", 3GPP Tdoc R2-096467, 3GPP TSG-RAN2 Meeting #68, Jeju, Korea, Nov. 9-13, 2009, 3 pages.
LG Electronics, Inc., "Logical Channel Prioritization for Aggregated Carriers", 3GPP Tdoc R2-095524, 3GPP TSG-RAN2 Meeting #67bis, Miyazaki, Japan, Oct. 12-16, 2009, 3 pages.
NEC, "Component carrier configuration/activation for carrier aggregation", 3GPP Tdoc R2-095576, 3GPP TSG RAN2 Meeting #67bis, Miyazaki, Japan, Oct. 12-16, 2009, 3 pages.
Nokia, et al., "Issues with Cross-Component Carrier Scheduling", 3GPP Tdoc R1-094645, 3GPP TSG RAN WG1 Meeting #59, Jeju, Korea, Nov. 9-13, 2009, 5 pages.
Nokia Corporation, et al., "Uplink scheduling with carrier aggregation", 3GPP Tdoc R2-100369, 3GPP TSG-RAN WG2 Meeting #68bis, Vallencia, Spain, Jan. 18-22, 2010, 3 pages.
Nokia Siemens Networks, et al., "CA and SPS", 3GPP Tdoc R2-100055, 3GPP TSG-RAN WG2 Meeting #68bis, Valencia, Spain, Jan. 18-22, 2010, 2 pages.
Nokia Siemens Networks, "Corrections and new agreements on Carrier Aggregation", 3GPP Tdoc R2-106123, 3GPP TSG-RAN WG2 Meeting #72, Jacksonville, U.S.A., Nov. 15-19, 2010, 5 pages.
Qualcomm Incorporated, "Clarification to SFN reference in RRC", 3GPP Tdoc R2-101396, 3GPP TSG-RAN WG2 meeting #69, San Francisco, USA, Feb. 22-26, 2010, 3 pages.
Rapportuer (Samsung), "Introduction of Carrier Aggregation and UL/DL MIMO", 3GPP Tdoc R2-106147, 3GPP TSG-RAN WG2 Meeting #72, Jacksonville, US, Nov. 15-19, 2010, 82 pages.
Samsung, "General issues on carrier aggregation", 3GPP Tdoc R2-093903, 3GPP TSG RAN WG2 #66bis, Los Angeles, U.S., Jun. 29-Jul. 3, 2009, 4 pages.
Samsung, "REL-10 Logical channel prioritization", 3GPP Tdoc R2-100492, 3GPP TSG-RAN2 #68bis meeting, Valencia, Spain, Jan. 18-22, 2010, 1 page.
ZTE, "Logical channel prioritization for carrier aggregation", 3GPP Tdoc R2-095672, 3GPP TSG RAN WG2 #67bis, Miyazaki, Japan, Oct. 12-16, 2009, 3 pages.
ZTE, "Logical channel prioritization for carrier aggregation", 3GPP Tdoc R2-096769, 3GPP TSG RAN WG2 #68, Jeju, Korea, Oct. 9-13, 2009, 3 pages.
ZTE, "Mapping of Logical channels to component carriers", 3GPP Tdoc R2-095671, 3GPP TSG RAN WG2 #67bis, Miyazaki, Japan, Oct. 12-16, 2009, 9 pages.
"3rd Generation Partnership Project Technical Specification; LTE; Evolved Universal Terrestrial Radio Access (E-UTRA); Multiplexing and Channel Coding (Release 9)", 3GPP TS 36.212 V9.3.0, Oct. 2010, 63 pages.
"Chinese Office Action", Chinese Application No. 201080052647. 9, May 27, 2014, 15 pages.
"Chinese Office Action (English Translation)", Chinese Application No. 201080052647.9, May 27, 2014, 11 pages.
"Russian Office Action", Russian Application No. 2012125265, Oct. 24, 2014, 7 pages.
"Russian Office Action (English Translation)", Russian Application No. 2012125265, Oct. 24, 2014, 7 pages.
Golitsyn, O L., et al., "Informatsionnye tekhnologii (Information Technology)", Information technology: Tutorial—2nd ed., Rev. and add. (Neck); INFRA-M, ID Forum, Moscow, 2009, 2 pages.
Nokia Siemens Networks, "Corrections and new agreements on Carrier Aggregation", 3GPP Tdoc R2-106854, Change Request 36.300 CR 0269, rev 2, V10.1.0, 3GPP TSG-RAN WG2 Meeting #72, Jacksonville, USA, Nov. 15-19, 2010, 6 pages.
Rapporteur (Samsung), "Introduction of Carrier Aggregation and UL/ DL MIMO", 3GPP Tdoc R2-106856, 3GPP TSG-RAN WG2 Meeting #72, Jacksonville, USA, Nov. 15-19, 2010, 88 pages.
"Russian Notice of Allowance", Russian Application No. 2012125265, Feb. 26, 2015, 8 pages.
"Russian Notice of Allowance (English Translation)", Russian Application No. 2012125265, Feb. 26, 2015, 6 pages.
"Official Notice of Rejection", Japanese Patent Application No. 2015-046225, Dec. 15, 2015, 3 pages.
"Official Notice of Rejection (English Translation)", Japanese Patent Application No. 2015-046225, Dec. 15, 2015, 3 pages.
"Official Notice of Rejection", Japanese Patent Application No. 2014-240566, Dec. 15, 2015, 8 pages.
"Official Notice of Rejection (English Translation)", Japanese Patent Application No. 2014-240566, Dec. 15, 2015, 9 pages.
Huawei, "Further considerations on Cross-Carrier PDCCH Scheduling", 3GPP Tdoc R1-094700, 3GPP TSG RAN WG1 meeting #59, Jeju, Korea, Nov. 9-13, 2009, 4 pages.
LTE-Advanced Rapporteur (NTT DOCOMO), "TP for TR36.814 on uplink control signalling for carrier aggregation", 3GPP Tdoc R1-094960, 3GPP TSG RAN WG1 Meeting #59, Jeju, Korea, Nov. 9-13, 2009, 2 pages.
MediaTek Inc., "Optimization on Intra-eNB Pcell Change Procedure", 3GPP Tdoc R2-104421, 3GPP TSG-RAN WG2 #71, Madrid Spain, Aug. 23-27, 2010, 4 pages.
NEC, "Component carrier configuration/activation for carrier aggregation", 3GPP Tdoc R2-094240, 3GPP TSG RAN2 Meeting #67, Shenzhen, China, Aug. 24-28, 2009, 3 pages.
NEC, "Details on Carrier Aggregation Signaling", 3GPP Tdoc R2-095950, 3GPP TSG-RAN WG2 #67bis, Miyazaki, Japan, Oct. 12-16, 2009, 3 pages.
Nokia Corporation, et al., "Basic CC configuration in Carrier Aggregation", 3GPP Tdoc R2-096812, 3GPP TSG-RAN WG2 Meeting #68, Jeju, Korea, Nov. 9-13, 2009, 9 pages.
ZTE, "Considerations on scheduling in carrier aggregation", 3GPP Tdoc R2-093886, 3GPP TSG RAN WG2 Meeting #66bis, Los Angeles, USA, Jun. 29-Jul. 3, 2009, 4 pages.
Qualcomm Europe, "Interpreting the Carrier Indicator Field", 3GPP Tdoc R1-095069, 3GPP TSG RAN WG1 #59, Jeju, Korea, Nov. 9-13, 2009, 4 Pages.
Official Notice of Rejection, Japanese Patent Application No. 2014-240566, Jul. 26, 2016, 11 pages.
Official Notice of Rejection (English Translation), Japanese Patent Application No. 2014-240566, Jul. 26, 2016, 12 pages.

\* cited by examiner

COMPONENT CARRIER ACTIVATION/DEACTIVATION IN MULTI CARRIER SYSTEMS

CROSS REFERENCE TO RELATED APPLICATIONS

This application is a continuation of U.S. patent application Ser. No. 12/950,622 filed Nov. 19, 2010, which claims the benefit of U.S. provisional applications Nos. 61/262,810 filed Nov. 19, 2009; 61/293,520 filed Jan. 8, 2010; 61/304,149 filed Feb. 12, 2010; 61/307,803 filed Feb. 24, 2010; 61/314,446 filed Mar. 16, 2010; 61/330,150 filed Apr. 30, 2010; 61/355,756 filed Jun. 17, 2010; and 61/373,678 filed Aug. 13, 2010, all of which are incorporated herein by reference in their entireties.

FIELD OF THE INVENTION

This application is related to wireless communications.

BACKGROUND

In Long Term Evolution (LTE) Release 8 (R8), a base station may configure a wireless transmit/receive unit (WTRU) with downlink (DL) and uplink (UL) resources on a single DL carrier and a single UL carrier, respectively. The pair of DL and UL carriers may be considered to form a cell of the wireless network. The WTRU may take certain actions in response to the configuration, configuration parameters and access issues related to the activation/deactivation process. In LTE R8, there is no ambiguity from the perspective of the WTRU in taking action since the DL and UL resources are associated with the single DL carrier and the single UL carrier, respectively, which form a serving cell of the WTRU. In multi-carrier wireless systems, the WTRU may be assigned multiple serving cells, each consisting of one DL component carrier and possibly also one UL component carrier (CC). The WTRU may need to act and respond differently if the WTRU may be configured with multiple serving cells.

SUMMARY

Methods and apparatus for addressing wireless transmit/receive unit (WTRU) behavior in response to configuration, configuration parameters and access issues related to the activation/deactivation process when the WTRU may be configured with multiple serving cells or carrier aggregation.

BRIEF DESCRIPTION OF THE DRAWINGS

A more detailed understanding may be had from the following description, given by way of example in conjunction with the accompanying drawings wherein.

DETAILED DESCRIPTION

Figure 1A:
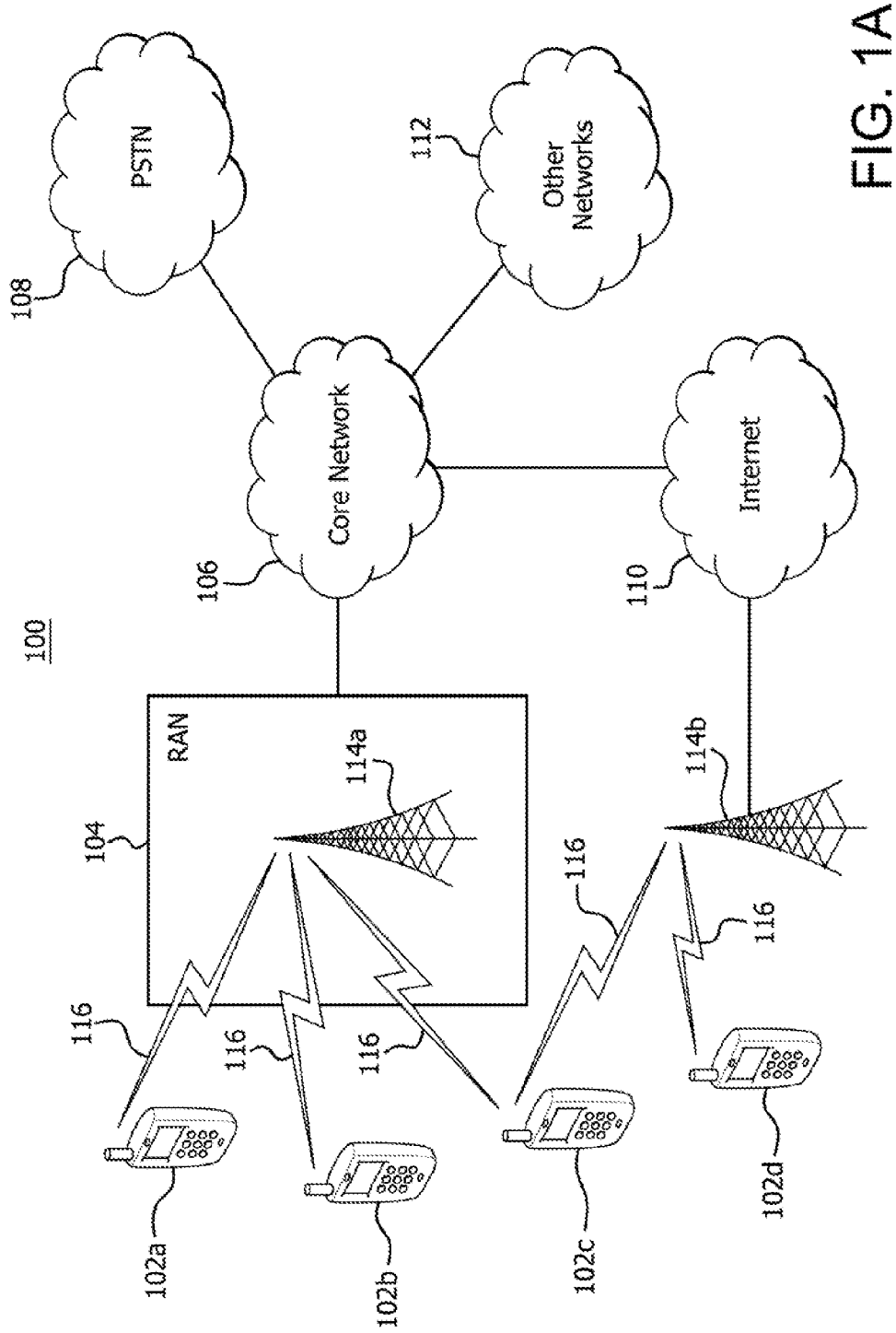
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a touchpad, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over air interface(s) 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In other embodiments, the base station 114a and the WTRUs 102a, 102b, 102c may implement any combination of the aforementioned radio technologies. For example, the base station 114a and the WTRUs 102a, 102b, 102c may each implement dual radio technologies such as UTRA and E-UTRA, which may concurrently establish one air interface using WCDMA and one air interface using LTE-A respectively.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
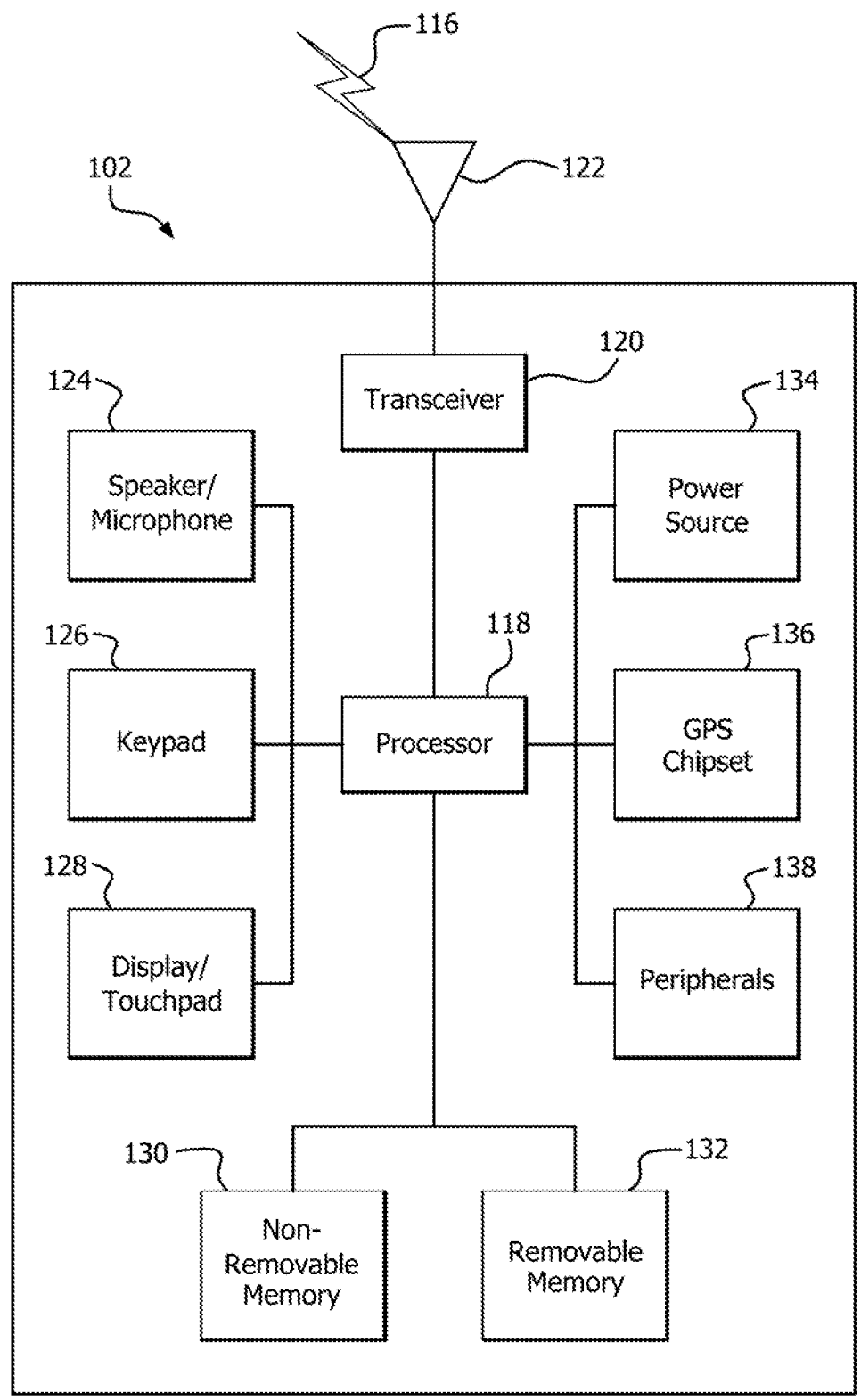
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/ receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, e.g., multiple antennas, for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128, (e.g., a liquid crystal display (LCD), display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
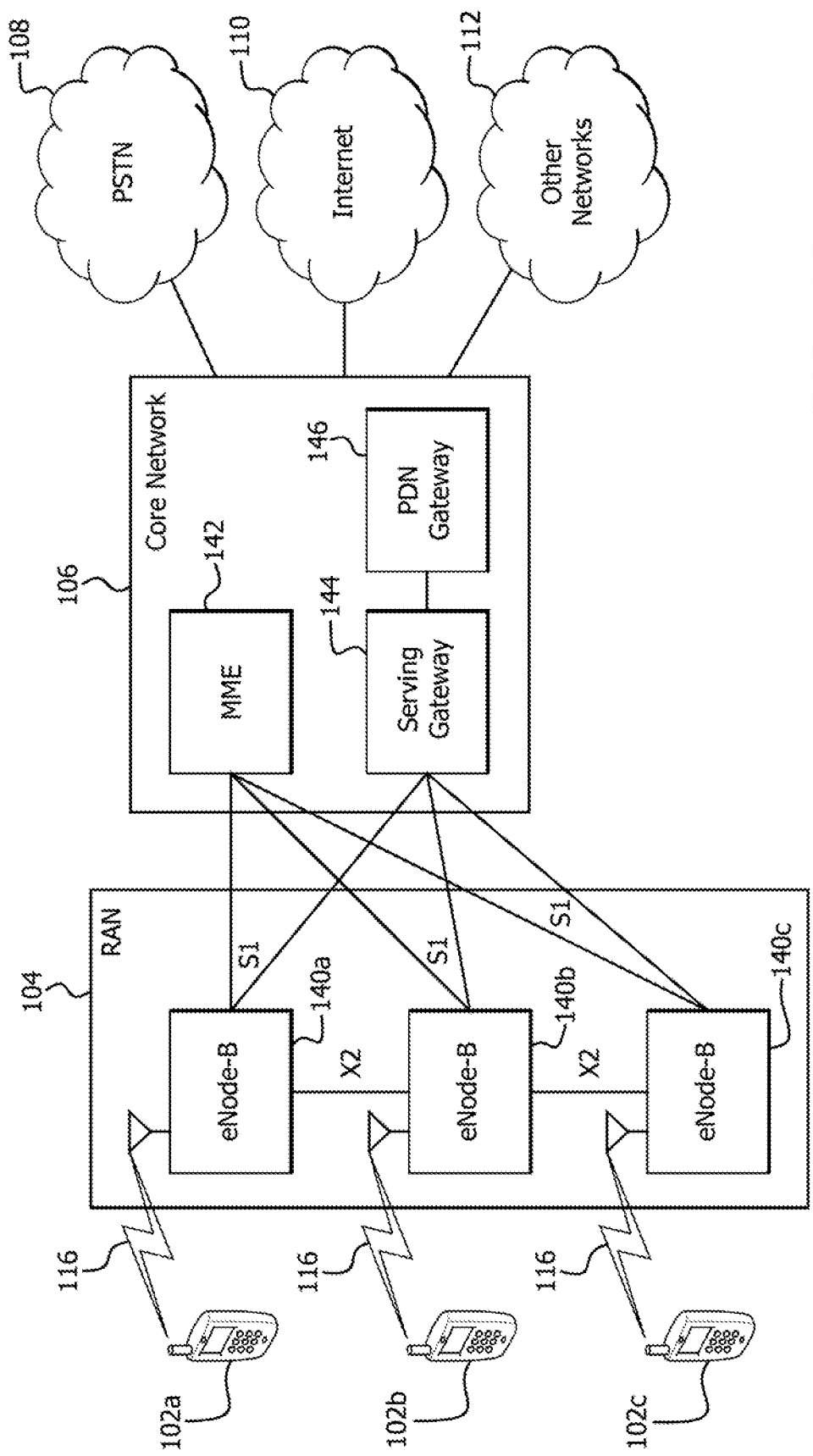
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with one or more cells (not shown), each possibly on different carrier frequencies, and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer setup/configuration/release, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

When referred to hereafter, the Physical Downlink Control CHannel (PDCCH) refers to the control channel used in LTE for scheduling of radio resources, e.g. the control channel on which the WTRU receives downlink control information (DCIs) messages. DCIs are mainly used for scheduling downlink and uplink resources in the control region of a downlink frequency on which the WTRU operates. It also refers to the case where the WTRU is a relay eNB for which the PDCCH channel is mapped on another downlink channel, (e.g. a PDSCH of the relay eNB configuration), to form the relay PDCCH (R-PDCCH).

When referred to hereafter, the term "Component Carrier (CC)" includes, without loss of generality, a frequency on which the WTRU operates. For example, a WTRU may receive transmissions on a downlink CC (hereafter "DL CC"). A DL CC may comprise a number of DL physical channels including, but not limited to, the Physical Control Format Indicator Channel (PCFICH), the Physical Hybrid Automatic Repeat Request Indicator Channel (PHICH), the PDCCH, the physical multicast data channel (PMCH) and the physical downlink shared channel (PDSCH). On the PCFICH, the WTRU receives control data indicating the size of the control region of the DL CC. On the PHICH, the WTRU may receive control data indicating hybrid automatic repeat request (HARQ) acknowledgement/negative acknowledgement (ACK/NACK) feedback for a previous uplink transmission. On the PDCCH, the WTRU receives DCI messages that are mainly used for scheduling downlink and uplink resources. On the PDSCH, the WTRU may receive user and/or control data. For example, a WTRU may transmit on an uplink CC (hereafter "UL CC"). An UL CC may comprise of a number of UL physical channels including, but not limited to, the physical uplink control channel (PUCCH) and the physical uplink shared channel (PUSCH). On the PUSCH, the WTRU may transmit user and/or control data. On the PUCCH, and in some cases on the PUSCH, the WTRU may transmit uplink control information, (such as channel quality indicator/precoding matrix index/rank indication (CQI/PMI/RI) or scheduling request (SR)), and/or HARQ ACK/NACK feedback. On a UL CC, the WTRU may also be allocated dedicated resources for transmission of Sounding Reference Signals (SRS).

A cell typically minimally consists of a DL CC which is, optionally, linked to a UL CC based on the system information (SI) received by the WTRU either broadcasted on the DL CC or possibly using dedicated configuration signaling from the network. For example, when broadcasted on the DL CC, the WTRU may receive the uplink frequency and bandwidth of the linked UL CC as part of the SystemInformationBlockType2 (SIB2) information element.

When referred to hereafter, the term "Primary Cell (PCell)" includes, without loss of generality, the cell operating in the primary frequency in which the WTRU either performs the initial connection establishment procedure or initiates the connection re-establishment procedure, or the cell indicated as the primary cell in the handover procedure. The WTRU uses the PCell to derive the parameters for the security functions and for upper layer system information such as NAS mobility information. Other functions that may be supported only on the PCell DL may include SI acquisition and change monitoring procedures on the broadcast channel (BCCH), and paging. The UL CC of the PCell may correspond to the CC whose PUCCH resources are configured to carry all HARQ ACK/NACK feedback for a given WTRU.

When referred to hereafter, the term "Secondary Cell (SCell)" includes, without loss of generality, the cell operating on a secondary frequency which may be configured once an RRC connection is established and which may be used to provide additional radio resources. System information relevant for operation in the concerned SCell is typically provided using dedicated signaling when the SCell is added to the WTRU's configuration. Although the parameters may have different values than those broadcasted on the downlink of the concerned SCell using the system information (SI) signaling, this information is herein referred to as SI of the concerned SCell independent of the method used by the WTRU to acquire this information.

When referred to hereafter, the terms "PCell DL" and "PCell UL" correspond to, without loss of generality, the DL CC and the UL CC of the PCell, respectively. Similarly, the terms "SCell DL" and "SCell UL" correspond to the DL CC and the UL CC, if configured, of a SCell, respectively. For the PCell, a CC may also be referred to as a PCC and for a SCell, a CC may be referred to as a SCC.

When referred to hereafter, the term "serving cell" includes, without loss of generality, a primary cell (i.e. a PCell) or a secondary cell (i.e. a SCell). More specifically, for a WTRU that is not configured with any SCell or that does not support operation on multiple component carriers, (i.e. carrier aggregation), there may be only one serving cell comprising of the Pcell. For a WTRU that is configured with at least one SCell, the term "serving cells" includes the set of one or more cells comprising of the PCell and all configured SCell(s).

When a WTRU is configured with at least one SCell, there is one PCell DL, (i.e., including one DL-SCH), and one PCell UL, (i.e., including one UL-SCH), and, for each configured SCell, there is one SCell DL and optionally one SCell UL, if configured.

The principles of activation and deactivation of a CC from the WTRU perspective herein may apply to at least one of a plurality of functions related to the CC. For example, for a DL CC, it may relate to PDCCH monitoring/decoding of a subset or all DCI formats such as UL DCIs, DL DCIs, both, or subsets thereof or PDSCH buffering/decoding. For a UL CC, it may relate for example to a PUSCH transmission, to a PUCCH transmission, to the transmission of CQI/PMI/RI or SRS transmission.

The methods described herein are applicable upon SCell activation/deactivation, without excluding an activation/deactivation which is a consequence of a reconfiguration that either adds or removes the SCell.

The examples described herein are generally applicable independently of whether or not DRX is configured and/or applicable for the serving cell(s).

The methods described herein are equally applicable where any DL CC and any UL CC are activated and deactivated independently, including DL and UL CCs associated to each other and including CCs that belong either to a PCell or to a SCell, and also to multiple CCs sharing the same activation/deactivation state.

A WTRU configured with at least one SCell may be configured with cross-carrier scheduling for one or more serving cells. Cross-carrier scheduling is a control signaling method where physical radio resources (DL transmission)

for PDSCH transmissions on the DL CC, or granted resources (UL transmission) for PUSCH transmissions on the UL CC, of a first serving cell may be assigned using the PDCCH of the DL CC of a second serving cell.

The term CC may refer to one or more DL CC(s), one or more UL CCs and/or a combination thereof and in particular the combination of a DL CC and a UL CC forming a serving cell of the WTRU's configuration, (i.e., either a PCell or a SCell). Such a combination of CCs may be achieved by configuration of the WTRU using associations between one or more UL CC(s) and one or more DL CC(s), for the purpose of assigning DL transmission resources, granting UL transmission resources, transmission of CQI/PMI/RI feedback, HARQ feedback, or for the transmissions related to the Random Access (RA) procedure, and the like.

The association between multiple configured CCs for a given WTRU may be based on, for example, at least one of the following methods: a set of configured CCs may be based on UL/DL associations such as "SIB2-linking" (e.g., by spectrum pairing, forming a cell of the system based either on broadcasted SI (SIB2) and/or on SI signaled to the WTRU using dedicated signaling, and/or pairing for UL/DL PCC), "Scheduling-linking" e.g. based on the CC being addressable for scheduling from the PDCCH of another CC, "HARQ Feedback-linking" e.g. based on the HARQ feedback relationship (DL CC, UL PUCCH, and UL CC, DL Physical Hybrid Automatic Repeat Request Indicator Channel (PHICH)), "Dedicated-linking" e.g. based on an RRC configuration for the cell (e.g., information elements in the configuration message that include at least the uplink frequency and bandwidth of the associated UL CC), and/or the use of other types of signaling (e.g., PHICH, PUCCH, PCFICH) between the base station and the WTRU across different CCs. A set of configured CCs may also be based on UL/UL associations derived from similar UL TA requirements and/or frequency bands e.g. "Band-linking". The configured CCs may also be based on DL/DL associations such as those derived from cross-carrier scheduling on PDCCH from one DL CC for the PDSCH of a different DL CC which is a further refinement of "Scheduling-linking" described above.

As a consequence, activation and/or deactivation of a given CC may be explicit using control signaling, or implicit based on some association with another CC, for example, by "SIB2-linking", "Scheduling-linking", "HARQ Feedback-linking", "Dedicated-linking", "Band-linking" or combinations thereof. The use of the term "concerned SCell" herein may cover both explicit or implicit cases and may correspond to any method used to provide the associations between a plurality of CCs to the WTRU.

The concerned SCell may be any SCell from the set of configured SCell(s) for the WTRU, including a SCell that may represent any of the following: a SCell that consists of a SCell DL associated with a SCell UL, a SCell DL configured without uplink resources, e.g., without associated SCell UL, any SCell DL independent of a possible associated SCell UL, or a SCell UL independent of a possible associated SCell DL. The concerned SCell may, or may not, transmit and/or receive control signaling information of its own e.g., by means of the PDCCH and/or PDSCH on a SCell DL.

In the example methods, activation and deactivation may be applied per cell, i.e., the activation state of the UL CC follows the state of the associated DL CC. This may be used with reference to the methods described herein without limiting its applicability to individuals CCs, to the PCell, or to other methods for associating a plurality of CCs. When referred to hereafter, the terms "SCell activation" and "SCell deactivation" thus includes, without loss of generality, all the above cases. For example, the concerned SCell may be the SCell which is activated and/or deactivated implicitly e.g., by timer expiration or explicitly by control signaling, such that both the SCell DL and the SCell UL that form the SCell as indicated by the System Information provided to the WTRU by either dedicated and/or broadcasted signaling, (e.g. using a SIB2 or SIB2-like information element), share the same activation/deactivation state.

A WTRU may be configured with at least one DL CC on which signaling for SCell activation (alternatively deactivation) may be received using: L1 signaling (e.g., physical downlink control channel (PDCCH) format carrying a component carrier indicator field (CCIF) which corresponds to the CC to which the activation/deactivation command applies; L2 signaling (e.g., medium access control (MAC) control element (MAC CE); or L3 signaling (e.g., radio resource control (RRC) information element (RRC IE)). Each of the signaling methods may be used by the WTRU to determine to which CC(s) (e.g. SCell) the received signaling applies. As an example this signaling may be received on a transmission on the PCell DL, or alternatively also on a transmission for an activated SCell DL.

Described herein are example control signals that may be sent/received upon activation or deactivation and may be used standalone or in combination.

The WTRU may receive and decode control signaling to activate or deactivate at least one concerned SCell, where the control signaling may be received by the WTRU on the DL CC of any of the serving cells of the WTRU. The control signaling may, for example, be scrambled by C-RNTI, or by a new A-RNTI_i as defined herein.

In particular, the control signaling may be received by the WTRU using at least one of L1, L2 and L3 signaling methods. For example, L3 signaling (e.g., RRC) may use an information element (IE) in a RRC Connection Reconfiguration message, or a different IE. Alternatively, L2 signaling (e.g., MAC) may use a control element (CE). Alternatively, L1 signaling may use an existing DCI format with fixed codepoints and/or scrambled using a special RNTI indicating control signaling for the purpose of SCell activation/deactivation (e.g., a carrier aggregation-radio network temporary identifier (CA-RNTI)). L1 may also use an explicit indication, e.g., a downlink control information (DCI) format with a component carrier identification field (CCIF) set to a value corresponding to the concerned SCell, which CCIF value may represent at least one of: the identity of the concerned SCell, a subset of SCells, (e.g. an index to an item in a configured set of SCells), or a reserved codepoint indicating a plurality of SCells (e.g., all configured SCells for the WTRU). The DCI format may be an extension of either one or a combination of the following formats: a PDCCH order for random access (RA) with CCIF corresponding to the concerned SCell; a PDCCH DL assignment with CCIF corresponding to the concerned SCell; a PDCCH UL grant with CCIF corresponding to the concerned SCell; a PDCCH activation with CCIF corresponding to the concerned SCell; or any of the L1 (e.g. PDCCH), L2 or L3 message above, with an explicit field indicating whether or not the WTRU may perform RA.

Additional information may be included in the control signaling for activation/deactivation. For example, the information may be an indication that at least one function may be restricted to a subset of CCs, including the case where the function applies to a single CC. This may be indication that the WTRU may consider the CC(s) as PCC. Alternatively, it may be an indication that the mapping between UL/DL PCC may differ from the mapping between UL/DL as indicated by the system information of the DL CC. As such, it may apply either to the UL PCC or the DL PCC.

Described herein are scenarios and methods related to how the WTRU determines the identity and activation/deactivation state of a given CC affected by activation and deactivation of SCells.

In one scenario, SCell identification for multiple SCells upon activation/deactivation may be affected. The base station may configure the WTRU with multiple SCells in addition to the PCell. If some or all of those SCells are not immediately activated by the configuration procedure, a separate activation/deactivation mechanism may be used and may support addressing individual SCells, which may require another mechanism to identify the SCells. For example, the configured SCell(s) may be initially deactivated when added by a radio resource controller (RRC) reconfiguration procedure, (with or without the mobility control information element), after a handover, (e.g. following the reception of a RRC reconfiguration with the mobility control element), until first activated by reception of activation/deactivation control signaling, which control signaling includes an explicit identity of the SCell(s) for which the control signaling applies, e.g., by the reception of an activation/deactivation MAC control element (CE) activating one or more of the deactivated SCell(s).

In another scenario, the base station may configure the WTRU with a number of DL CCs different than the number of UL CCs. For example, there may be more DL CCs than UL CCs. How to convey this information to the WTRU may need to be addressed, in particular if SCell DL and SCell UL may be activated and deactivated independently of any possible association, and to avoid unnecessary or disallowed access to UL resources corresponding to a SCell for which the UL may not be configured.

For the purpose of activating a concerned SCell DL, the WTRU may activate the concerned SCell DL from the reception on a DL CC of any one of: control signaling for transmissions on the concerned SCell DL (e.g., DCI format 1/1A/1B/1C/1D/2/2A); any control signaling for the concerned SCell DL such as for example including a component carrier indicator field (CCIF) of the concerned SCell DL; or control signaling using any one of a set of pre-determined signaling formats containing an identity of the concerned SCell DL such as a DCI format typically used for signaling of UL resources containing a CCIF of the concerned SCell DL. For example, DCI format 0, (typically used for granting UL resources), DCI format 1A (typically used for DL assignment or PDCCH order for RACH), DCI format 3/3A (typically used for uplink power control); or an existing format with a fixed codepoint may be used including any extensions thereof. Another example may use an activation/deactivation MAC CE containing a bitmap, where each bit in the bitmap corresponds to a specific SCell and indicates whether the SCell may be in the activated state or in the deactivated state. A concerned SCell UL may be similarly handled using the corresponding signaling and formats.

The WTRU may deactivate a concerned SCell DL from reception of signaling similar to that described herein for the activation of a SCell DL.

For the purpose of activating a concerned SCell UL, the WTRU may activate the SCell UL from the reception of control signaling indicating that UL resources are granted, (e.g., a grant), to the WTRU (e.g., DCI format 0 or DCI format 3/3A, for example augmented with a CCIF corresponding either to the identifier of the SCell UL or to any SCell DL which may be associated with the SCell UL) and/or indicating that the WTRU may perform a procedure related to UL transmission, (e.g., a power control message or request for random access). Alternatively, the WTRU may activate the SCell UL from the reception of control signaling for transmissions on a SCell DL, (e.g., DCI format 1/1A/1B/1C/1D/2/2A), associated with the SCell UL. The WTRU may also activate the SCell UL from the reception of any control signaling, (for example including CCIF for the SCell DL), for a SCell DL associated with the SCell UL.

For example, a N-bit CCIF, (e.g., CCIF may be represented by a 3-bit value as an indication for 5 or more CCs), may represent a single numbering space for the identities of the DL CCs. Alternatively, it may represent a single numbering space for the configured UL CCs. Alternatively, it may represent a single numbering space for the configured serving cells. Additional codepoints may be used to identify all or a subset of the serving cells at one time. For example, it may be used to identify the SCells. The control signaling, (e.g., the UL grant, the DL assignment, the order to perform RA, or the power control command), of the message may still be applied either to the serving cell where the signaling was received, to the UL CC associated with the DL CC where the signaling was received, (whether it is the UL CC or the DL CC may depend on the nature of the signaling e.g., whether the control signaling is for an downlink or an uplink transmission), or to a specific serving cell, (e.g., a PCell), of the WTRU configuration.

The WTRU may deactivate a concerned SCell UL from reception of signaling similar as described herein for the activation of a SCell UL.

For a SCell, for the purpose of activating a concerned SCell, the WTRU may activate the concerned SCell DL and the concerned SCell UL, if uplink resources are configured for the concerned SCell, from reception of signaling similar as described above.

For a SCell, for the purpose of deactivating a concerned SCell, the WTRU may deactivate the concerned SCell DL and the concerned SCell UL, if uplink resources are configured for the concerned SCell, from reception of signaling similar as described herein for the activation of a SCell.

Whether or not the WTRU may activate and/or deactivate a SCell UL from the implicit activation of an associated SCell DL may depend on any one of the following factors. Rephrased, it may depend on whether or not the WTRU has received a configuration for uplink resources associated with the SCell DL. In particular, it may depend on whether or not the dedicated configuration includes configuration parameters for UL resources. It may also depend from the absence, (also indicating implicit release of the parameters if configured), for the corresponding UL/DL pair (cell) of some or all of the information elements (Ies). For example, in the PhysicalConfigDedicated IE, the PUCCH configuration (pucch-ConfigDedicated); PUSCH configuration (pusch-ConfigDedicated); power control configuration (uplinkPowerControlDedicated, tpc-PDCCH-ConfigPUCCH, tpc-PDCCH-ConfigPUSCH), CQI measurement configuration (cqi-ReportConfig), or sounding configuration (soundingRS-UL-ConfigDedicated) may be absent. There may also be an explicit indication in the RRC configuration that a specific SCell UL may not be used.

In the case where DCI format 1A may be used for the purpose of activating a SCell, the WTRU may determine that the signaling used for the purpose of activating the SCell, (and not for the purpose of a PDCCH order for random access channel (RACH) or for compact scheduling of PDSCH), by checking the value(s) of certain fields. For example, the DCI format 1A may be interpreted as an activation order if the fields are set in the same way as for a PDCCH order for RACH except that one or several bits in one of the fields that are set to pre-determined values in the case of a PDCCH order for RACH is (are) set to a different value(s). Alternatively, the WTRU may determine that the signaling may be used for the purpose of activation (or not) based on the value of the CCIF. For instance, the signaling may be interpreted as a PDCCH order in the case where the CCIF is set to a specific value (e.g., 000), and as an activation command in the case where the CCIF is set to any other value which then represents one or more carriers to be activated.

In one example method, the control signaling described herein may provide sequential activation/deactivation. More specifically, the WTRU may maintain a list of one or more configured SCell(s) following a specific order, for example, based on configuration (e.g., RRC). Upon reception of a SCell activation command, the WTRU may activate the next configured, but inactive SCell in the list. Similarly, upon reception of a deactivation command, the WTRU may deactivate the active SCell that was activated the latest. Alternatively, the identity of the SCell being activated/deactivated may be obtained implicitly from the identity of the SCell from which the activation/deactivation command is received. Sequential activation/deactivation may occur within a configured set of SCells (e.g., activation/deactivation of SCell set 1 may take priority over set 2, etc.).

In another example method, a Radio Network Temporary Identifier may be allocated to identify control signaling sent on the PDCCH. This may be used by the WTRU to determine whether or not it shall act on received control signaling and for which signaling it attempts decoding. When referred hereafter, the A-RNTI_i is used to denote an RNTI reserved for activation/deactivation functionality. The A-RNTI_i described herein may have WTRU-dedicated RNTI values, for example one for each CC, SCell, and/or for the activation/deactivation command, or identical RNTI values, for example a single RNTI to identify the activation/deactivation command and/or for indicating that the command is applicable to all configured SCells. The WTRU may receive and decode, in any serving cell, control signaling (scrambled by C-RNTI, or by A-RNTI_i) to activate at least one concerned SCell.

Described herein are scenarios and methods related to implicit and explicit activation and deactivation of a given CC affected by activation and deactivation of SCells.

If a DL CC is activated for which the corresponding PDCCH may be activated, and in case cross-carrier scheduling is possible from that PDCCH, it may be desirable to have methods to ensure that any other relevant SCells may be scheduled as soon as possible. This assumes that the cross-carrier scheduling relationship between different configured serving cells is known, (e.g., configured), at the time the activation command is received. Otherwise, if this relationship is not known, it may be useful to provide means for a WTRU to determine which DL CC may be used to schedule newly activated SCell(s) based on the activation control signaling. For example, the WTRU may receive in a RRC message that configures the dedicated physical radio resource configuration for a SCell, e.g., a PhysicalConfigDedicatedSCell IE, a configuration for the cross-carrier scheduling of the SCell, e.g., a CrossCarrierSchedulingConfig IE, which configuration includes an identity of the serving cell used to schedule the SCell in case cross-carrier scheduling is applicable to the SCell.

When the WTRU activates a concerned SCell, the WTRU may activate the SCell DL from the reception of the control signaling. If the WTRU is configured to monitor the PDCCH of the DL of the concerned SCell, the WTRU may additionally activate any other SCell for which said PDCCH may also provide control signaling, (e.g., DL assignments, UL grants, other control messages, e.g., power control commands). That is, the WTRU may activate any other SCell for which cross-carrier scheduling from the PDCCH of the DL of the concerned SCell may be applicable. Restated, if a SCell is not active which SCell is configured with cross-carrier scheduling for, or alternatively from, the concerned SCell, then the WTRU may additionally activate that SCell together with the concerned SCell.

When the WTRU deactivates a concerned SCell, the WTRU may deactivate a second SCell following the deactivation of the concerned SCell DL if the concerned SCell DL was previously used to provide control signaling (e.g., DL assignments, UL grants, other control messages, e.g., power control commands) and/or if no control signaling is further possible for the second SCell following the deactivation of the concerned SCell. For example, if the concerned SCell is deactivated which may have been needed for control signaling purposes for the second CC, then the WTRU may also deactivate the second SCell.

Described herein are example methods related to the reception of activation/deactivation control signaling.

In one scenario, it may be desirable to trigger additional WTRU procedure(s) upon activation/deactivation of a concerned SCell. This may be achieved either implicitly from the change in activation/deactivation state of the concerned SCell, or explicitly by including additional signaling information inside the activation/deactivation command.

Example methods related to the reception of activation/deactivation control signaling may be any of the following: upon reception by the WTRU of the control signaling, the WTRU may activate/deactivate/release previously configured dedicated DL resources for the SCell such as semi-persistent scheduling (SPS) resources; the WTRU may trigger a report of the WTRU's power headroom for the CC upon activation of the CC; the WTRU may trigger internal reporting of HARQ failure for a HARQ process to upper layer(s), (e.g., to the radio link control (RLC)), upon explicit or implicit deactivation of a SCell with configured uplink resources using the services of the HARQ entity controlling the HARQ process to lower the latency of retransmissions; the WTRU may determine the transmission mode to use for UL control signaling, which transmission format may depend on the number of configured, (or alternatively active), SCell(s), e.g., the transmission mode of the HARQ feedback and/or the CQI/PMI/RI information on the PUCCH; the WTRU may determine the resources for acknowledgement of control signaling for SCell (de)activation; the WTRU may determine the CC behavior upon activation, e.g., which resource and in which CC the HARQ feedback/CQI/PMI/RI may be sent for PDSCH transmissions and whether or not the WTRU may monitor PDCCH in the newly activated SCell; the WTRU may determine the MAC WTRU behavior upon reconfiguration, including the removal of at least one SCell; the WTRU may determine MAC WTRU behavior upon deactivation of at least one SCell; the WTRU may determine whether or not cross-carrier scheduling is used for CCs upon activation; or the WTRU may determine the size of the control region of a SCell being activated, (e.g., information typically found by the WTRU on the PCFICH which allows the WTRU to determine the location in time of the first symbol of the PDSCH), especially for a SCell DL for which cross-carrier scheduling is used.

Additional example methods related to the reception of activation/deactivation control signaling may be used, in particular if each configured UL CC is associated with one or more DL CC(s), e.g., by "SIB2-linking", "Dedicated-linking", "HARQ feedback-linking", "Scheduling-linking" or "Band-linking" as described above, or the use of control signaling between the base station and the WTRU across different CCs. The methods described herein may be used by a WTRU upon reception of control signaling from the base station for the purposes described below. The reception of the control signaling may trigger WTRU procedures for obtaining/maintaining the WTRU's UL TA needed to perform transmissions on UL resources corresponding to the serving cell and may trigger WTRU procedures for obtaining/maintaining the WTRU's SI needed to access UL resources corresponding to the CC, and/or may trigger WTRU procedure to access DL resources of one or more DL CC(s) associated with the UL CC. It may also be used to trigger WTRU procedures for activating/deactivating/releasing previously configured dedicated UL resources for the UL CC such as PUCCH resources allocated for CQI, PMI, RI, and SR; SPS resources, or SRS resources.

For example, a WTRU configured with at least one SCell may, upon activation of the concerned SCell for which the applicable TAT is not running, initiate transmission of a random access procedure on a PRACH resource of the concerned SCell.

For example, a WTRU configured with at least one SCell may not transmit SRS for the concerned SCell when the concerned SCell is deactivated.

For example, a WTRU configured with at least one SCell may not report CQI, PMI, or RI for the concerned SCell when the concerned SCell is deactivated.

For example, a WTRU configured with at least one SCell may not transmit on PUSCH for the SPS resources when the concerned SCell is deactivated, if at least one SPS resource is configured for the concerned SCell.

For the example methods further described herein, the control signaling received by the WTRU from the base station may be L1, (e.g., PDCCH), L2 (e.g., MAC), or L3, (e.g., RRC), messages. A message may apply to a subset of, (e.g., one or more), configured SCells. The signaling may be received on a DL CC which is already active, e.g., on the PCell DL. Alternatively, the signaling may be received on a DL CC which is already active e.g. on any active serving cell, and applied to a different SCell.

In another scenario, it may be desirable to improve the robustness of the (de)activation procedure to ensure a coherent view of the available resources from both the base station and the WTRU's perspective. This may be achieved by transmitting explicit acknowledgement of the activation/deactivation command, e.g., using a similar mechanism as the "HARQ feedback" on the PUCCH.

Another aspect of the described methods address how a WTRU configured with at least one SCell, upon reception of control signaling for activation/deactivation of at least one SCell for which an acknowledgement may be sent, may determine which resource to transmit the acknowledgement onto.

Described herein are example methods where upon reception of the control signaling for which the WTRU may be expected to transmit feedback (e.g., acknowledgement), the WTRU may determine that feedback may be transmitted in a resource (e.g., format and/or location and/or channel coding) of the control region (e.g., in the PUCCH region) of the UL CC if the UL CC is configured for all HARQ feedback transmissions (e.g., PCell UL), the UL CC is associated (e.g., paired) to the DL CC on which the control signaling was received, and/or the UL CC is configured for the purposes of transmitting feedback. In addition, the location on the above UL CC corresponds to one of: a resource (e.g., location) computed based on the first CCE of the PDCCH which indicated the presence of the control signaling, one of a set of configured (e.g., RRC) resources (e.g., format and/or locations and/or channel coding), indicated by an index that may be provided in the control signaling; or in combination with any of the above, a resource (e.g., location) offset from the PUCCH region of the UL CC, where the offset may be derived from an index to the associated DL CC.

Another aspect of the described methods address how a WTRU configured with at least one SCell, upon reception of control signaling, may determine whether or not a SCell may be activated/deactivated.

The described examples herein may include the case where at least part of the control signaling may be received by the WTRU as configuration for multicarrier operation even when the initial SCell state upon (re)configuration is "deactivated". In particular, the initial values for the parameters relating to the aspects of a WTRU's reception on a SCell DL, for example, may be at least one of: a PCFICH value or CFI indicating the size of the control region; an indication of whether or not CFI may be used; a TAT value or TAC; one or more RNTI(s) for the WTRU, e.g. a SCell-specific C-RNTI, a CA-RNTI, a A-RNTI_i as described above). Moreover, the initial values for the parameters relating to the aspects of a WTRU's transmission on a UL CC, for example, may be at least one of a dedicated HARQ feedback resource and/or an index to a measurement configuration. This may be included in the WTRU's configuration of corresponding said CCs.

Described herein are scenarios and methods related to how the WTRU configured with at least one SCell determines the size of the control region on a given SCell DL affected by activation and deactivation of SCells.

Before the WTRU may decode the PDSCH on a newly activated SCell, it may first determine the location of the first symbol of the PDSCH. When there is no cross-scheduling for a given serving cell, the WTRU typically decodes the Physical Control Format Indicator Channel (hereafter PCFICH). The PCFICH may be found at specific location(s) known to the WTRU and its value may change in any subframe. The PCFICH indicates the size of the control region of the DL CC in which it is carried (e.g., whether it is 0, 1, 2, 3, or 4 symbols). Once the WTRU knows the size of the control region, it may implicitly determine the location of the first symbol of the PDSCH. When cross-carrier scheduling is used, the WTRU may not have the capability to decode the PCFICH for the scheduled resources, or the PCFICH may not be available, and thus means for the WTRU to determine the size of the control region for a given serving cell (e.g. a configured SCell) may be desirable.

The information in the control signaling received by the WTRU configured with at least one SCell may also include a Control Format Indicator (CFI). The WTRU may use the CFI to determine the size of the control region of a DL CC. In particular, a DL CC which is being activated may be a secondary CC of the WTRU. Restated, when the WTRU is configured with cross-carrier scheduling, the WTRU may be provided with the starting OFDM symbol of PDSCH for the concerned SCell within the RRC control signaling that configures the concerned SCell and/or that configures the WTRU for cross-carrier scheduling, i.e. with a value that the WTRU uses when the concerned SCell is activated which value indicates the size of the control region of the SCell DL of the concerned SCell.

Described herein are example methods for handling cross-carrier scheduling. For a UL or a DL CC, for the purpose of cross-carrier scheduling, (e.g., PDSCH in the case of a DL CC and PUSCH in the case of a UL CC), of the CC, (or multiple CCs in case the control signaling activates more than one SCell at once), the WTRU determines which PDCCH(s) corresponding to which DL CC(s) may provide control signaling, (e.g., DL assignments, UL grants, other control messages, e.g., power control commands), for the CC using at least one of the following methods.

In one example, the WTRU may determine that the PDCCH of the SCell DL for which the control signaling for SCell activation is applicable, (i.e., the concerned SCell), may be used to schedule the concerned SCell, (i.e., similar behavior as for a Rel-8 serving cell). For the case of a SCell DL, this may be based on an explicit indication of whether or not the WTRU may decode the PDCCH for the concerned SCell DL. In another example, the WTRU may determine that the PDCCH of the DL CC from which the control signaling for SCell activation is received may be further used to schedule the concerned SCell (i.e., cross-carrier scheduling from the DL CC on which the activation command was received). In another example, the WTRU may determine that the PDCCH of a DL CC (e.g. the PDCCH of the PCell) may be further used to schedule the concerned SCell based on a configuration received for the concerned SCell, (e.g., RRC configuration).

For example, a WTRU configured with at least one SCell may determine, upon activation of a concerned SCell, that the PDCCH of the concerned SCell DL may be used for the reception of control signaling, (e.g. DCIs), for scheduling based on a configuration of the concerned SCell, such as received in a RRC message that includes a configuration of the concerned SCell for the dedicated physical radio resources, e.g., a PhysicalConfigDedicatedSCell IE, which included a configuration for the cross-carrier scheduling of the SCell, e.g. a CrossCarrierSchedulingConfig IE, indicating that cross-carrier scheduling is not used for the concerned SCell. Additionally, the WTRU may also determine the size of the control region based on a parameter, e.g., a value indicating the first symbol of the PDSCH of the concerned SCell, received in the RRC message that configured the concerned SCell e.g., inside the configuration for the cross-carrier scheduling of the SCell. Alternatively, if the configuration includes an identity of the serving cell from which the concerned SCell is scheduled, the WTRU may determine that the PDCCH of the DL CC of said indicated serving cell may be used to schedule transmissions for the concerned SCell.

The WTRU may also deactivate a SCell if the WTRU receives signaling from the network indicating that a handover may be performed. For example, this may happen upon reception of the RRCConnectionReconfiguration message including the mobilityControlInfo IE. The WTRU may also deactivate a SCell if the WTRU starts a handover timer such as the T304 timer.

In another example, the WTRU configured with at least one SCell may deactivate all configured SCells following the processing of control signaling indicating that the WTRU shall perform a handover to another serving cell, e.g., following the processing of a RRC reconfiguration message with the mobility control information element. A SCell of the WTRU's configuration may then be first activated by reception of activation/deactivation control signaling which control signaling includes an explicit identity of the SCell(s) for which the control signaling applies e.g., by the reception of an activation/deactivation MAC CE activating one or more of the deactivated SCell(s).

Described herein are example methods that follow an error condition. The WTRU may deactivate a concerned SCell if at least one of the following conditions occurs. The WTRU may deactivate a concerned SCell if the WTRU initiates the RRC connection re-establishment procedure or if the WTRU starts a timer T311 (initiation of RRC Connection Re-establishment procedure). For example, if the specific CC for which radio link failure (RLF) is detected is a PCell of the WTRU configuration, as a consequence the WTRU deactivates all configured/active SCell(s) upon RLF for at least said PCell. Restated, the WTRU configured with at least one SCell may deactivate all configured SCells when the WTRU initiates the RRC connection re-establishment procedure after it determines downlink and/or uplink RLF for the PCell. The WTRU may also deactivate a concerned SCell if the WTRU may detect RLF in a specific CC under certain situations. For example, if the specific SCell is a SCell of the WTRUs configuration, the WTRU may deactivate the specific SCell after it determines downlink and/or uplink RLF for said specific SCell. In all of the above cases, the configuration of the deactivated SCell(s) may be removed from the WTRU's configuration. In another example, the specific CC for which RLF is detected may be a SCell of the WTRU configuration, including where at least said SCell is deactivated upon RLF detection for the SCell. In this case, the configuration of the deactivated SCell(s) may be removed from the WTRU's configuration.

The WTRU may also deactivate a concerned SCell if the WTRU fails a reconfiguration procedure. For example, a deactivation may occur when the failed reconfiguration may have been performed due to the reception of RRC signaling from the base station (e.g., a RRCConnectionReconfiguration), the reconfiguration may have been applicable to the concerned SCell, or the reconfiguration may have been applicable to a PCell.

Described herein are scenarios and methods related to transmissions by the WTRU on configured downlink and/or uplink resources affected by activation and deactivation of SCells. Such resources are configured for a WTRU by dedicated signaling and may include periodic dedicated sounding reference signal (SRS) transmission resources, UL and/or DL SPS resources, periodic transmission of CQI, PMI, RI either on a dedicated PUCCH resource allocation or on a PUSCH transmission, a dedicated resource for SR transmission on PUCCH, a configuration for transmission of HARQ ACK/NACK feedback on one or more PUCCH resources, and the like.

In one scenario, the WTRU may be configured with a dedicated radio resource configuration when it has a connection to the base station. When SCells are activated and later deactivated, how to handle dedicated resources may need to be addressed to avoid a WTRU creating interference with other WTRUs in the concerned serving cell for which dedicated resources may be configured and to minimize additional signaling overhead.

The described methods also address how a WTRU configured with at least one SCell, upon activation/deactivation of a given subset, (i.e., one or more), of SCell(s), may determine whether or not it may start/stop/release configured dedicated UL resources, e.g., PUCCH for CQI/PMI/RI, SRS or SPS resources and perform the procedure to start/stop/release configured UL resources, if needed.

The described methods also address how a WTRU configured with at least one SCell, upon reception of control signaling for activation/deactivation of at least one concerned SCell, may determine the resources and the respective UL CC on which to transmit HARQ feedback as well as whether or not it may monitor the PDCCH associated with the activated concerned SCell(s).

When the WTRU activates a concerned SCell, for the purpose of handling configured UL resources for the concerned SCell, the WTRU may start using the configured UL resources if at least one of the following conditions occurs: if the control signaling received includes an indication to activate configured UL resources corresponding to the concerned SCell, (e.g., for SPS, for SRS and on the PUCCH for CQI, SR, PMI, RI); if the TA applicable to the UL resources associated with the concerned SCell is valid; or if the control signaling is received on a PDCCH and scrambled using a specific RNTI, (e.g., A-RNTI_2).

The described methods also address how a WTRU, upon deactivation of a given subset, (i.e., one or more), of SCell(s), may determine whether or not it may release configured dedicated DL resources, e.g., SPS resources and perform the procedure to release configured DL resources, if needed.

When the WTRU activates a concerned SCell, for the purpose of handling configured DL resources for the concerned SCell, the WTRU may start using those resources if one of the following conditions occurs: if the control signaling received includes an indication to activate configured DL resources corresponding to the concerned SCell (e.g., for SPS) or if the control signaling is received on PDCCH and scrambled using a specific RNTI (e.g., A-RNTI_3).

When the WTRU deactivates a concerned SCell, for the purpose of handling of configured DL resources for the configured SCell, the WTRU may release the configuration for those resources on the occurrence of any of the following situations. The WTRU may release if the control signaling received includes an indication to release configured DL resources corresponding to the concerned SCell (e.g., for SPS) or if the control signaling is received on PDCCH and scrambled using a specific RNTI (e.g., A-RNTI_5).

In another example, the control signaling may contain an indication of whether or not the WTRU may resume using previously configured UL/DL resources, e.g., PUCCH resources for ACK/NACK, PUCCH resources for CQI/PMI/RI/SR, SRS, SPS grant and/or assignment, and the like or portions thereof. It may be an index to an item in a set of the previously configured UL/DL resources. For example, the WTRU may use a configured resource of a SCell being activated, and/or the WTRU may use a configured resource of a given serving cell, (e.g., the PCell), upon deactivation of a SCell.

In another example, the WTRU may stop using a configured resource of a SCell being deactivated, and/or the WTRU may stop using a configured resource of a given serving cell, (e.g., the PCell), upon deactivation of another SCell.

When the WTRU deactivates a concerned SCell, for the purpose of handling of configured UL resources for the concerned SCell, the WTRU may release the configuration for any UL resources for SRS, for CQI/PMI/RI/SR on PUCCH and for SPS on the occurrence of any of following situations. The WTRU may release the configuration if the control signaling received includes an indication to release UL resources for SRS and CQI/PMI/RI/SR on PUCCH and for SPS for the concerned SCell. The WTRU may release the configuration if the control signaling is received on PDCCH and scrambled using a specific RNTI, (e.g., A-RNTI_4). The WTRU may release the configuration when the TA applicable to the UL resources of the concerned SCell are no longer valid, (e.g., corresponding TAT expires after deactivation), following deactivation.

Described herein are further example methods for handling sounding reference signals (SRS).

In another scenario, the base station may configure a WTRU-specific periodic SRS resource for SRS transmission on the radio resources of a UL CC. On a condition that there would be no explicit activation/deactivation for the SRS resources e.g., based on the state of the PUSCH of a UL CC, it may be desirable to have methods to avoid transmission of SRS while the WTRU is not active in UL transmissions on PUSCH. Restated, if the activation/deactivation control signaling is not applicable to UL CCs, a mechanism to suspend periodic transmissions on configured SRS resources of said UL CC may be desirable.

The described methods also address how a WTRU configured with at least one SCell, while PUSCH transmissions are not active in a given SCell UL, may determine whether or not it may transmit SRS on a configured periodic resource (or resources).

For a UL CC, for the purpose of determining whether or not to transmit SRS on a configured SR resource in a given UL CC, the WTRU start (or continue) transmission of SRS in the UL CC using the configured SRS resources. In particular, the WTRU may start, or restart if already running a timer (e.g., SRS-InactivityTimer): upon (re)configuration of the UL CC not removing the UL CC; upon reception of a UL grant for a PUSCH for the UL CC; upon a PUSCH transmission on the UL CC; upon a trigger or transmission of a SR and/or a BSR, which may be in combination with the WTRU's buffer reaching a configured threshold; upon the WTRU buffers reaching a configured threshold; or upon explicit signaling, e.g., L1 PDCCH or L2 MAC CE.

The WTRU may then transmit SRS in the UL CC using the configured SRS resources for a predefined time following the occurrence of one of the above events. That is, the transmission is stopped after a specific period of UL inactivity for the CC. In one embodiment, this may be implemented by transmitting SRS in the UL CC using the configured SRS resources and stopping transmission of SRS in the UL CC when the timer, e.g., SRS-InactivityTimer, expires.

When the WTRU deactivates a concerned SCell, the WTRU may stop any UL transmissions (UL-SCH, PUSCH, SRS) for the deactivated SCell UL after a time t, (where t is a positive number), following the successful decoding of the control signaling.

Described herein are scenarios and methods related to monitoring of downlink control signaling by the WTRU affected by activation and deactivation of SCells.

The described methods may also address how a WTRU, upon reception of control signaling for (de)activation of at least one SCell, may determine which DCI format(s) it may monitor on a given PDCCH.

When the WTRU activates a concerned SCell, the WTRU may start receiving the PDSCH and, if the concerned SCell is configured for PDCCH reception, start monitoring PDCCH for grants and assignments, (e.g. scrambled by C-RNTI, SI-RNTI, P-RNTI, M-RNTI, or the like), on DL resources associated with the concerned SCell.

When the WTRU activates a concerned SCell, if the WTRU is configured for cross-carrier scheduling for the concerned SCell on the PDCCH of another serving cell, and if the WTRU has a configured WTRU-specific PDCCH Search Space (SS) for reception of the scheduling control information applicable to the concerned SCell and/or if the WTRU receives in the activation command an identity of the PDCCH SS, (e.g. a PDCCH SSID), corresponding to the concerned SCell, then the WTRU may start decoding PDCCH in the search space corresponding to the concerned SCell, (e.g., corresponding to the SSID), for the DCI formats applicable to the concerned SCell DL and, if configured, may start decoding DCI formats applicable to the associated/linked SCell UL. This may occur, for example, for the case where the PDCCH used for cross-carrier scheduling corresponds to the PCell DL or for the case where the PDCCH used for cross-carrier scheduling implicitly corresponds to the DL CC on which the control signaling for activation was received by the WTRU.

In another example, the control signaling may contain an indication in the control signaling applicable to a SCell DL, whether or not the WTRU may decode the PDCCH in the SCell DL.

When the WTRU deactivates a concerned SCell, the WTRU may stop receiving PDSCH and stop monitoring PDCCH, (if configured for PDCCH reception), for grants and assignments, (scrambled by C-RNTI, SI-RNTI, P-RNTI, M-RNTI, or the like), on DL resources associated with the concerned SCell. The WTRU may, based on L3 measurement configuration and/or CQI configuration, continue to perform the related measurements and other radio link maintenance tasks such as periodic monitoring of SI and/or paging at specific occasions for the concerned SCell.

When the WTRU deactivates a concerned SCell, if the WTRU is configured for cross-carrier scheduling for the concerned SCell, and if the WTRU has a configured WTRU-specific SS for the scheduling control information applicable to the concerned SCell on the PDCCH of a different serving cell, the WTRU may stop decoding PDCCH in the PDCCH search space corresponding to the concerned SCell, (e.g., corresponding to the SSID). For example, a WTRU configured with at least one SCell may not monitor the PDCCH of a deactivated SCell and may not receive any downlink assignments or uplink grants associated to a deactivated SCell.

When the WTRU activates or deactivates a concerned SCell, the WTRU may also change the formats of the DCIs it monitors on PDCCH. If cross-carrier scheduling is used, the WTRU may start decoding the DCI formats accordingly, (e.g., DCI formats with the CCIF indicator), for the number of assignments and grants possible given the number of active serving cells scheduled by a given PDCCH. If different transmission modes are supported on different activated SCells for which the WTRU monitors assignments and grants in a given PDCCH, the WTRU may start decoding the DCI formats accordingly, e.g., the WTRU may decode all formats for each supported transmission mode for the number of assignments and grants possible given the number of active SCells supporting each mode. This may be done in the subframe in which the WTRU received the control signaling for activation/deactivation of the SCell(s), after a fixed amount of time, (e.g., a WTRU processing time such as 4 ms), from the subframe in which the WTRU received the control signaling for activation/deactivation of the SCell(s), or after a fixed amount of time from the subframe in which the WTRU transmitted an acknowledgement of the control signaling.

When the WTRU activates or deactivates a concerned SCell, for the purpose of decoding DL control information, (e.g., PDCCH), the WTRU determines at least one of the following for a given PDCCH: which DCI format(s) to decode; which physical resources, (e.g., control channel elements); and how many decoding attempts to perform. The above PDCCH determination may be based on whether or not the PDCCH of the DL CC, (e.g. the PCell DL), supports cross-carrier scheduling to at least one other CC, (e.g., one or more SCell(s)). It may also be based on the number of activated SCell UL(s) and SCell DL(s), and their respective transmission modes, (i.e., which DCI format corresponds to their transmission mode), for which the PDCCH may carry a DL assignment or an UL grant. Alternatively, it may be based on whether or not the DCI format uses the additional CCIF field, or special codepoints. For example, if one CC supports spatial multiplexing and another CC does not on a DL CC whose PDCCH supports scheduling for both CCs, the WTRU may decode against format 1 and format 2. In addition, once the WTRU finds the maximum possible number of DL assignments for a given DCI format, it may stop decoding against this format.

Described herein are scenarios and methods related to handling of ongoing transmissions affected by activation and deactivation of SCells.

In one scenario, handling of ongoing transmissions for multiple SCells upon deactivation may be affected. Deactivation of a SCell may occur while one or more uplink transmissions on the SCell UL are still ongoing. This may abort the ongoing transmission(s) and introduce additional transmission delays by relying on higher layer detection of the failed transmission and initiating a retransmission. Deactivation of a SCell may occur while one or more downlink transmissions on the SCell DL have not yet completed.

The described methods also address how a WTRU configured with at least one SCell, upon deactivation of a given subset, (i.e., one or more), of SCell(s), may determine whether or not it may inform upper layers, (e.g., RLC), of a HARQ failure for a given MAC service data unit (SDU) (i.e., RLC PDU), i.e., perform a local NACK from MAC to RLC, for a uplink HARQ process of a given SCell; and perform the procedure to initiate retransmission of the RLC PDU, if needed.

When the WTRU deactivates a concerned SCell, for the purpose of handling HARQ processes that have not yet completed their (re)transmissions upon deactivation of the SCell UL using the services of the corresponding HARQ entity, e.g., for HARQ processes that still have data in their respective HARQ buffer and that are either suspended, (e.g., a HARQ ACK on PHICH was last received), or have ongoing retransmissions, (e.g., a HARQ NACK on PHICH was last received), if the HARQ process has data in its buffer, the WTRU may indicate to upper layers, (e.g., RLC), that transmission for the corresponding MAC SDU(s) has failed, (i.e., for the corresponding RLC PDU(s)), and flush the HARQ buffer.

When the WTRU deactivates a concerned SCell, for the purpose of handling a HARQ process state for the concerned SCell, the WTRU may set new data indicators (NDIs) to 0 for all UL HARQ and/or flush the DL HARQ buffers, (i.e., the next transmission is considered a new transmission).

For example, when a WTRU configured with at least one SCell deactivates a concerned SCell either explicitly e.g., when the WTRU receives an activation/deactivation command such as an Activation/Deactivation MAC CE deactivating the concerned SCell, or implicitly e.g., following the expiration of a deactivation timer, the WTRU may flush all HARQ buffers associated with the concerned SCell.

Described herein are scenarios and methods related to the power headroom reporting procedure by the WTRU affected by activation and deactivation of SCells.

A WTRU's power control may be performed per UL CC to compensate for slow-varying channel conditions. Some of the power control parameters such as Transmit Power Control (TPC), DL path loss measurements, and offsets may be common to more than one UL CC.

In LTE R8/9, the power headroom reporting procedure may be used to provide the serving eNB with information about the difference between the nominal WTRU maximum transmit power for UL-SCH transmissions. UL power control in LTE Release 8 (R8) may be based on a combined open loop and closed loop power control mechanism. The open loop component may be based on pathloss (PL) estimation which is based on the WTRU's measurements of Reference Signal Received Power (RSRP) in the DL CC used as the Path Loss (PL) reference and the known transmit power of the DL Reference Signal (RS), which value is typically broadcasted as system information. The pathloss estimation may be used by the WTRU to determine uplink transmit power, and this estimation is based on a DL CC which is herein referred to as the PL reference. The closed loop component may be based on direct control of WTRU transmit power by means of explicit power control commands (TPC) transmitted on the PDCCH.

For LTE Release 10 (R10), when the WTRU operates with at least one SCell, a SCell UL may be configured with a PL reference for the purpose of uplink power control. For example, the PL reference of a SCell UL may be a PCell DL of the WTRU's configuration, or the PL reference of a SCell UL may be configured as part of the WTRU's configuration (e.g., one per frequency band).

In LTE R10, when the WTRU is configured with at least one SCell, a power headroom report may consist in either the power headroom value for a transmission corresponding to the UL-SCH in a given serving cell, herein referred as PHR Type 1, or the power headroom for transmissions on the PUCCH and the UL-SCH for the PCell, herein referred as PHR Type 2. The definitions of Power Headroom Type 1 and Type 2 are as shown in Table 1.

TABLE 1

5.1.1.2 Power headroom

There are two types of UE power headroom reports defined. A UE power headroom PH valid for subframe i for serving cell c .
Type 1:

$PH_c(i) = P_{CMAX,c} -$
$\{10\log_{10}(M_{PUSCH,c}(i)) + P_{O\_PUSCH,c}(j) + \alpha_c(j) \cdot PL + \Delta_{TF,c}(i) + f_c(i) \}$ [dB]

where, $P_{CMAX,c}$, $M_{PUSCH,c}(i)$, $P_{O\_PUSCH,c}(j)$, $\alpha_c(j)$, PL, $\Delta_{TF,c}(i)$ and $f_c(i)$ are defined in section 5.1.1.1.
Type 2:

$PH_c(i) = P_{CMAX,c} -$ $10\log_{10}\left( 10^{(10\log_{10}(M_{PUSCH,c}(i))+P_{O\_PUSCH,c}(j)+\alpha_c(j)\cdot PL+\Delta_{TF,c}(i)+f_c(i))/10} + 10^{(P_{O\_PUCCH}+PL+h(n_{CQI},n_{HARQ})+\Delta_{F\_PUCCH}(F)+g(i))/10} \right)$
[dB]

where, $P_{CMAX,c}$, $M_{PUSCH,c}(i)$ , $P_{O\_PUSCH,c}(j)$, $\alpha_c(j)$ $\Delta_{TF,c}(i)$ and $f_c(i)$ are the
primary cell parameters as defined in section 5.1.1.1 and $P_{O\_PUCCH}$, PL, $h(n_{CQI},n_{HARQ})$, $\Delta_{F\_PUCCH}(F)$ and g(i) are defined in section 5.1.2.1
The power headroom shall be rounded to the closest value in the range [40; −23] dB with steps of 1 dB and is delivered by the physical layer to higher layers.

In one scenario, power headroom reporting for multiple SCell UL upon activation may be affected. How the WTRU notifies the base station of the WTRU's power headroom for a given SCell UL upon activation may need to be addressed to ensure that the scheduling process in the base station has suitable and up-to-date information from the WTRU.

The described methods also address how a WTRU configured with at least one SCell, upon activation of a given subset, (i.e., one or more), of SCell(s), may determine whether or not it may trigger the transmission of a PHR for a given UL CC and perform the procedure to transmit a PHR, if needed.

When the WTRU activates a concerned SCell, for the purpose of reporting the WTRU's power headroom for the concerned SCell, the WTRU may trigger a PHR which reported PHR corresponds to the power headroom for the SCell UL corresponding to the concerned SCell if the control signaling received includes an indication to trigger PHR. Alternatively, a PHR may be triggered if the power headroom requirement applicable to the SCell UL associated with the concerned SCell differs from that of any other active UL CCs (i.e., a valid power headroom value for the SCell UL may not be inferred from that of another UL CC). Alternatively a PHR may be triggered if the number of activated SCell(s) changes. Restated, every activation of a concerned SCell may trigger a PHR, which PHR may include at least a report for the concerned SCell and may also include a PHR for all configured and/or active serving cells.

For example, a WTRU configured with at least one SCell triggers a power headroom report for each activated serving cell with configured uplink resources when the WTRU activates at least one SCell with configured uplink resources.

If a PHR has been triggered and is pending for transmission and if the WTRU has uplink shared channel (UL-SCH) resources for a new transmission, the WTRU may report a valid PHR value applicable to the SCell UL corresponding to the concerned SCell by using one of following methods. In one method, a PHR may be reported inside a MAC PHR CE in a MAC packet data unit (PDU) transmitted on a UL-SCH resource of a SCell UL corresponding to the concerned SCell. In another method, the PHR may be reported inside a MAC PHR CE in a MAC PDU transmitted on a UL-SCH resource of any UL CC for which the calculated PHR may be applicable. In another method, the PHR may be reported inside a MAC PHR CE in a MAC PDU transmitted on a UL-SCH resource of any UL CC, where the MAC PHR CE may include a CCIF indicating for which UL CC(s) the reported PHR value may be applicable. Restated, when the WTRU is configured with at least one SCell, if a PHR has been triggered and the PHR is pending in a subframe for which the WTRU has resources allocated for at least one new transmission on any serving cell, the WTRU may transmit a MAC PHR CE including at least a power headroom value for the concerned SCell and maybe a value for the PCell and all other SCell(s) that are activated in said subframe.

In addition, when a PHR value is calculated for a UL CC using measurements and/or estimates based on a DL CC, e.g., path loss estimation and/or RSRP measurements, the WTRU may consider any of the DL CCs associated with the UL CC for which the PHR is calculated.

The described methods also determine whether or not to include control information. In one method, the WTRU determines, for each transport block (TB) within a given TB subset, whether or not it shall include specific control information, (e.g. MAC CE), based on the characteristics of the MAC CE for transmission in a given TTI.

Described herein are characteristics that may be related to the MAC CE. One characteristic may be whether or not the transmission of a MAC CE is specific to a given CC, including the case where a TB for the CC is granted for a transmission in this TTI and the MAC CE contains: 1) information, (e.g. PHR), which is applicable to said CC, or to a related subset of CC(s); 2) information, (e.g. C-RNTI), which is related to an ongoing procedure, (e.g. Random Access), applicable to said CC, (e.g. CC of the PCell), or to a related subset of CC(s); or 3) information, (e.g. BSR), which is expected to be transmitted only in a specific CC, (e.g., CC of the PCell), or to a related subset of CC(s).

Another characteristic may be the relative priority of the MAC CE. For example, (similar to LTE MAC Rel-8), the WTRU may take into account the following relative priority in decreasing order: 1) MAC CE for C-RNTI or data from UL-CCCH; 2) MAC CE for buffer status report (BSR), with exception of BSR included for padding; 3) MAC CE for PHR; 4) data from any logical channel (LCH), except data from UL-CCCH; or 5) MAC CE for BSR included for padding. For example, a PHR reporting the power headroom value, (either for PUCCH, PUSCH or both), calculated for a given UL CC may be included only in the MAC packet data unit (PDU) of a TB that corresponds to said UL CC if said TB is granted for a transmission in this TTI. In another example, a BSR reporting the state of the WTRU's buffer after all TBs of this TTI have been filled may be included in the MAC PDU of a TB that corresponds to a specific CC only if said TB is granted for a transmission in said CC, (e.g. the CC of the PCell).

Another characteristic may be the type, (including format and content), of the MAC CE. The WTRU may select a MAC CE type as a function of the contained information. The WTRU may determine whether the MAC CE contains information related to a PCC (or PCell) or related to a SCC (or SCell) of the WTRU's configuration. For the example of a MAC CE for PHR, the WTRU may select a MAC CE PHR type_2 if the content of the PHR is applicable to a PCC (or PCell) of the WTRU's configuration. Otherwise a MAC CE PHR type_1 is selected for a SCC (or SCell).

In another instance, the WTRU may determine whether or not the MAC CE contains information applicable to a first CC (either a PCC or a SCC) and the MAC CE is transmitted on the first CC. For example, when the WTRU transmits, on a TB of a second CC, a MAC CE with contents applicable to a first CC, the WTRU selects a MAC CE format that includes an explicit identification of the first CC, (either SCC/SCell or PCC/PCell). In other words, the identity of the first CC may be omitted in the MAC CE format included if it is included in a MAC PDU transmitted on the first CC. Alternatively, a MAC CE that does not include an explicit CC identification may be used if the identity of first CC may be derived based on the order of the MAC CE(s) in the MAC PDU. This may be applicable for the case where more than one MAC CE for the same function, (but possibly of different type), may be included in the same MAC PDU. For example, a WTRU may include multiple MAC PHR CEs, (one for each configured and/or activated serving cell), in the same MAC PDU either following the order in which the serving cells were configured, (e.g., by RRC), and/or following the explicit serving cell identity value, (e.g., a cell index), assigned to each serving cell or something similar.

Another characteristic may be the type(s) of physical channel, (e.g. PUSCH and/or PUCCH), for which the WTRU performs uplink transmission(s) in the subframe in which the MAC CE is transmitted. This may be possibly only transmission(s) in the same CC, (either SCC/SCell or PCC/PCell), on which the MAC CE is transmitted. For example, for a PHR for a first CC, (either SCC/SCell or PCC/PCell), the WTRU may select MAC CE PHR Type_1 if the WTRU performs only a PUSCH transmission in said first CC or the WTRU may select MAC CE PHR Type_2 if the WTRU performs a PUCCH transmission and a PUSCH transmission in said first CC.

Another characteristic may be the type(s) of physical uplink channel, (e.g. PUSCH and/or PUCCH), that may be used by the WTRU for uplink transmission(s) in a first CC, although such transmission is not performed by the WTRU in the subframe in which a MAC CE applicable to the first CC is transmitted on an uplink transmission on a second CC. In particular, if the content of the PHR MAC CE may include a "virtual" power headroom value for a first CC, the WTRU may select a MAC CE PHR Type_1 for CC(x) if the first CC is not configured for PUCCH transmission. The contents may include a power headroom value derived based on a "virtual" PUSCH transmission. Otherwise, the WTRU may select MAC CE PHR Type_2 for the CC, where the contents may include a power headroom value derived based on a "virtual" PUSCH transmission and a "virtual" PUCCH value. A "virtual" power headroom value above refers, for the part related to a PUSCH transmission, to a value derived by the WTRU for a first CC although no PUSCH transmission is performed, the first CC in the subframe used for transmission of the corresponding PHR on a second CC. Such a value may for example be inferred from the power that would have been used by the WTRU given a specific modulation code scheme (MCS) and a specific number M of resource blocks (RBs), which MCS and M may e.g., be derived either from a fixed, (e.g. specified or configured), value also known to the eNB, or from the grant corresponding to a previous transmission on said first CC. Similarly, for the part related to a PUCCH transmission, (if applicable for a first CC), it refers to a value derived based on a transmission using e.g., a pre-determined format such as format 1a. In all of the above cases, PUSCH transmission may be used independently of whether or not the transmission includes uplink control information (UCI) and/or data.

The WTRU, once it determines that it shall include control information in a TB, may later take into account the size of the control information when serving data from the LCH(s) for the TB subset.

When the WTRU determines whether or not control information should be included, the WTRU may also perform the above for the PCell and possibly also for each configured SCell, (and possibly also activated). For example, if for PHR reporting the WTRU may report "virtual" power headroom values for configured and activated serving cells when a PHR is triggered, the WTRU may determine which serving cells are configured and activated and would include a PHR MAC CE for each of those serving cell in at least one TB.

Described herein are scenarios and methods related to the WTRU's uplink timing alignment affected by activation and deactivation of Scells for a WTRU configured with at least one SCell.

A WTRU may be configured with at least one SCell UL, i.e., with one or more set(s) of serving cells with configured uplink resources, for which the timing advance (TA) may differ from that of the PCell UL. For example, this may happen when two UL CCs each have one or more of the following characteristics: different coverage areas, (e.g., based on CC band); different propagation characteristics, (e.g., based on path loss); or different or multiple points of origin, (e.g., different eNBs and/or due to frequency selective receivers, COMP deployment scenarios, remote radio heads and the like).

In one scenario, the TA may differ between different SCell UL and this may impact the WTRU's operation on multiple serving cell(s). This may be true when the serving cells are not in the same frequency band or for certain deployment scenarios (e.g., using repeaters or remote radio heads from the same base station). On a condition that a WTRU is connected to the PCell, and that additional SCells may be configured and (de)activated on an as-needed basis, when the TAT applicable to a serving cell that is less used (and occasionally inactive) is not running, care should be taken upon (re)activation to ensure that the WTRU does not initiate UL transmissions before having proper time alignment or before having up-to-date system information (SI). How to handle other dedicated UL/DL resources configured for the WTRU may also need to be addressed.

The described methods also address how a WTRU configured with at least one SCell, upon activation of a given subset (i.e., one or more) of concerned serving cell(s), may determine whether or not it may consider itself time-aligned, i.e., whether or not it may use the UL resources in a concerned SCell without creating unnecessary interference to transmissions of other WTRUs in that SCell; perform the procedure(s) to gain UL time-alignment for at least one of the SCells in the subset; and/or maintain timing alignment for at least one of the SCell(s) in the subset.

For illustrative purposes only, the methods described herein may be applicable to a WTRU configured with at least one SCell, where the SCell has configured uplink resources, that may be connected to a base station and where a SCell may be initially activated by the base station or when the TAT corresponding to a SCell is shorter than the period under which the concerned SCell was inactive, (e.g., in which case the TAT may not have been restarted and/or may have expired). Different UL CCs may have different TA requirements based on, for example, frequency or Physical Cell ID for the cell on the associated DL CC. The WTRU may have a connection to a PCell of the base station (e.g., RRC_CONNECTED in LTE).

When the WTRU activates a concerned SCell, for the purpose of maintaining the UL timing alignment, the WTRU may perform RA using RACH resources corresponding to the concerned SCell UL under any one of the following conditions: if the control signaling received includes an indication to trigger RA; if the TA applicable to the SCell UL resources associated with the concerned SCell is not valid (e.g., corresponding TAT is not running); or if the control signaling is received on a PDCCH and scrambled using a specific RNTI (e.g., A-RNTI_0).

In one example, the control signaling may contain an indication (explicit, implicit, or both) of whether or not the WTRU may perform the RA procedure, by at least one of the following: using the resources corresponding to the SCell indicated by the CCIF; using the RA resources (RA preamble, PRACH mask) explicitly indicated in the control signaling for activation/deactivation; and/or if the TAT corresponding to the SCell (or group thereof) is not running. For example, the WTRU configured with at least one SCell may initiate the random access procedure on RA resources of the concerned SCell upon activation of the concerned SCell, in particular if the TAT corresponding to the concerned SCell is not running. Alternatively, the WTRU may initiate the random access procedure on RA resources of another serving cell which shares the same Timing Alignment requirement than that of the concerned SCell.

When the WTRU activates a concerned SCell, for the purpose of applying the TA Command (TAC) received after the activation of the concerned SCell, the WTRU may apply the received TAC to the TA of the UL CC corresponding to the DL CC on which the TAC was received or to the TA of all UL CCs having the same TA requirements as the UL CC corresponding to the DL CC on which the TAC was received.

In another example, the control signaling may contain a Time Alignment Command (TAC), which the WTRU applies to at least one of: a UL CC identified explicitly in the control signaling using e.g., a CCIF; the SCell UL corresponding to the concerned SCell which is being activated; or a group of UL CCs having the same TA requirements. The specific group may be identified based on the UL CC identified as described above. For example, the WTRU may apply a TAC received on the PDSCH of the concerned SCell to the TA of said concerned SCell and, may be to the TA of another activated SCell which shares the same Timing Alignment requirement than that of the concerned SCell.

When the WTRU configured with at least one SCell deactivates a concerned SCell, for the purpose of handling any RA procedure operating in the concerned SCell, the WTRU may stop any ongoing RACH procedure for the concerned SCell. Alternatively, the WTRU may discard any explicitly signaled preamble (e.g., ra-PreambleIndex) and PRACH resource (e.g., ra-PRACH-MaskIndex), if any, and if applicable to the concerned SCell. Alternatively, the WTRU may also release, if any and if applicable to the concerned SCell, the Temporary C-RNTI.

Described herein are example methods for handling MAC reconfiguration. For a SCell DL or a SCell UL, for the purpose of handling WTRU MAC behavior for a RRC (re)configuration including the removal (release) of at least one SCell, the WTRU may: stop, if any, ongoing RACH procedure for the removed component carrier; discard explicitly signaled preamble (e.g., ra-PreambleIndex) and PRACH resource (e.g., ra-PRACH-MaskIndex), if any, and if applicable to the removed SCell; and/or release, if any and if applicable to the removed SCell, Temporary C-RNTI.

The RRC (re)configuration of additional CCs may implicitly trigger the above RA procedures, for the purpose of gaining TA in serving cells for which the WTRU has no valid TA. This may apply to initial configuration and/or to any reconfiguration of the serving cells. The RRC (re)configuration of additional SCell(s) may also implicitly trigger a PHR. This may apply to initial configuration and/or to any reconfiguration of the serving cell(s).

Described are example methods and/or actions upon reaching the maximum number of transmission of attempts for scheduling requests (SR) on PUCCH that may affect the configuration, activation and deactivation of SCells for a WTRU configured with at least one SCell.

For the purpose of handling the WTRU configured with at least one SCell, when the number, (SR_COUNTER), of transmission attempts for the SR on the configured and valid PUCCH resource for the SR reaches, (or exceeds), the maximum value configured by the network, (e.g., dsr-TransMax), the WTRU may deactivate all configured and active SCell(s), if any. This may include deactivation of the CQI/PMI/RI configuration for the SCells. Alternatively, the WTRU may initiate a random access and cancel all pending SRs, which may include initiating the random access on the UL resources of a configured SCell. Alternatively, the WTRU may clear any configured downlink assignments and uplink grants. Alternatively, the WTRU may release the configuration for multicarrier operation, including at least one of the following: the SCell(s) configuration, (possibly only the UL SCell configuration); the PUCCH configuration for HARQ ACK/NACK transmissions; the PUCCH configuration for CQI/PMI/RI transmissions; or the PUCCH configuration for SR transmissions. In effect, the above examples may result in implicit deactivation or release of all SCells due to reaching the maximum number of SRs.

In one example method, the WTRU may release the entire multicarrier configuration, (i.e., SCell(s), PUCCH resources for HARQ A/N, CQI/PMI/RI, SR), as well as any configured assignments or grants, and revert to single carrier R8 or R9 operation in the serving cell corresponding to the PCell of the WTRU's multicarrier configuration. The WTRU may then initiate a random access in said serving cell, (i.e. the PCell). Table 2 provides an embodiment of this example method.

TABLE 2

If an SR is triggered and there is no other SR pending, the UE may set the SR_COUNTER to 0.
As long as one SR is pending, the UE may for each TTI:
if no UL-SCH resources are available for a transmission in this TTI:
if the UE has no valid PUCCH resource for SR configured in any TTI: initiate a Random Access procedure (see subclause 5.1) and cancel all pending SRs;
else if the UE has a valid PUCCH resource for SR configured for this TTI and if this TTI is not part of a measurement gap and if sr-ProhibitTimer is not running:
if SR_COUNTER < dsr-TransMax:
increment SR_COUNTER by 1;
instruct the physical layer to signal the SR on PUCCH;
start the sr-ProhibitTimer.
else:
notify RRC to release PUCCH/SRS and the configuration for all SCell(s), if any;
clear any configured downlink assignments and uplink grants;
initiate a Random Access procedure (see subclause 5.1) and cancel all pending SRs.

In another example, the WTRU may deactivate any activated SCell, (SCell DL(s) and SCell UL(s)), and release the configuration for the PUCCH resources related to multicarrier operation, (i.e., PUCCH resources for HARQ A/N, CQI/PMI/RI, SR), as well as any configured assignments or grants, and perform a random access by selecting an available resource on any UL CC of its multicarrier configuration. It may select the PCell UL. For SCell UL(s), if no explicit deactivation state is defined, the WTRU may ignore any received uplink grants at least until it receives control signaling to reconfigure the multicarrier operation. Table 3 provides an embodiment of the example method.

TABLE 3

If an SR is triggered and there is no other SR pending, the UE may set the SR_COUNTER to 0.
As long as one SR is pending, the UE may for each TTI:
if no UL-SCH resources are available for a transmission in this TTI:
if the UE has no valid PUCCH resource for SR configured in any TTI: initiate a Random Access procedure (see subclause 5.1) and cancel all pending SRs;
else if the UE has a valid PUCCH resource for SR configured for this TTI and if this TTI is not part of a measurement gap and if sr-ProhibitTimer is not running:
if SR_COUNTER < dsr-TransMax:
increment SR_COUNTER by 1;
instruct the physical layer to signal the SR on PUCCH;
start the sr-ProhibitTimer.
else:
notify RRC to release PUCCH/SRS;

TABLE 3-continued deactivate all activated SCell(s), if any;
[ignore any received uplink grant(s) for all configured UL SCC(s), if any, until RRC reconfigures the UE for multicarrier operation]
clear any configured downlink assignments and uplink grants;
initiate a Random Access procedure (see subclause 5.1) and cancel all pending SRs.

Described herein are scenarios and methods related to radio link monitoring procedures affected by activation and deactivation of SCells for a WTRU configured with at least one SCell.

In one scenario, the base station may configure the WTRU with at least one SCell in addition to the PCell. If the radio link quality of some or all of the serving cells deteriorates beyond some quality criteria, a mechanism to increase the capability of the WTRU to either recover or improve communication towards the system may be needed.

The described methods also address how a WTRU configured with at least one SCell, upon detection of physical layer problems and/or detection of a reduction in radio link quality below a certain threshold, may implicitly activate some or all of the configured SCell(s) and/or disable power saving algorithms (e.g., discontinuous reception (DRX)) for those SCell(s).

For a SCell DL, for the purpose of activating a SCell DL, the WTRU may monitor and/or detect physical layer problems, such as poor reception of synchronization signals based on, for example, the occurrence of a number of out-of-sync indications from the physical layer, (e.g., N310, a value that may be configured by the base station), or failure to complete a number of random access procedure(s), (where the value may be configured by the base station). The WTRU may also monitor and detect radio link quality falling below a certain threshold. For example, measurements, (e.g., CQI), may fall below a certain threshold, (for example a value configured by the base station). The monitoring and detecting actions may be performed for the: PCell; configured SCell(s), whether or not the SCell is active/inactive; or configured serving cells including the PCell and whether or not the SCell is active/inactive.

The WTRU, upon detecting a physical layer problem or radio link degradation, may activate a first SCell DL and/or continuously monitor control signaling (e.g., independently of power savings functions such as DRX). These actions may be performed for the: PCell; configured SCell(s), whether or not the SCell is active/inactive; or configured serving cells including the PCell and whether or not the SCell is active/inactive. These actions may be performed at least until the WTRU receives from the base station an explicit deactivation for the SCell(s), wherein the explicit deactivation may be included in a radio reconfiguration message with or without the mobility control IE (i.e., handover command or a specific amount of time (e.g., timer T310) has elapsed. Upon expiration of the specific amount of time (e.g., timer T310), the WTRU may initiate either a change of PCell (e.g., a handover, connection re-establishment, or a reconfiguration procedure) within the set of configured SCells, or a connection re-establishment procedure to a different cell.

The WTRU may deactivate a concerned SCell if a radio link monitoring timer, such as timer T310, is running, and if the WTRU detects conditions that lead to the detection of physical layer problems, radio link quality does not rise above a certain threshold, and/or the concerned SCell was in a deactivated state prior to the start of the T310 timer (i.e., prior to the detection by the WTRU of physical layer problems).

When the WTRU deactivates a concerned SCell, the WTRU may stop receiving PDSCH and stop monitoring PDCCH (if configured for PDCCH reception) for grants and assignments (scrambled by C-RNTI, SI-RNTI, P-RNTI, M-RNTI, or the like) on DL resources associated with the concerned SCell. The WTRU may, based on L3 measurement configuration and/or CQI configuration, continue to perform the related measurements and other radio link maintenance tasks such as periodic monitoring of SI and/or paging at specific occasions for the concerned SCell.

Described herein are scenarios and methods related to acquisition and maintenance of System Information (SI) by the WTRU configured with at least one SCell affected by activation and deactivation of SCells.

In another scenario, when a SCell is inactive, the WTRU may not be required to periodically monitor the SI and it may not be desirable to have the WTRU monitor for SI notification in the deactivated SCell at some specific occasion. How the WTRU ensures that the SI is up-to-date upon SCell activation may need to be addressed to ensure that the WTRU may access the additional resources of the SCell.

Another aspect of the described methods address how a WTRU, upon activation of a given subset (i.e., one or more) of SCell(s) with CA, may determine whether or not it is required to acquire/update SI pertaining to at least one SCell of the subset; and perform the procedure(s) to acquire/update the SI.

When the WTRU activates a concerned SCell, for the purpose of maintaining valid SI for the concerned SCell, the WTRU may acquire SI for the concerned SCell using known procedures for SI acquisition when at least one of following conditions occurs: if the WTRU has no stored SI for the concerned SCell; if the control signaling received includes an indication to acquire SI; if the control signaling includes a value tag indicating that the stored SI is no longer valid; or if the control signaling is received on a PDCCH and scrambled using a specific RNTI (e.g., A-RNTI_1).

In another example, the control signaling may contain an indication of whether or not SI pertaining to the second CC has changed, e.g., based on a SI value tag of, for example, a 5-bit or a simple binary indication. The value tag may represent a portion of the SI pertaining to the second CC, such as the portion that may be required to be valid for proper operation on this second CC as part of a multicarrier wireless system. In this case, such a value tag may be provided in the SI of the second CC, in addition to the existing value tag representing the whole SI. Similarly, the binary indication may represent a change of a portion of the SI.

In addition, when the WTRU may re-acquire the SI for the PCell, change in some of the SI information may impact operation on the SCells (if configured and activated). For example, assuming the WTRU sends UL control information (e.g., HARQ A/N, CQI, and the like) on the PUCCH resources of a single UL CC (e.g., the PCell UL), a change in the PUCCH configuration may impact the transmission of the control signaling.

The WTRU may also deactivate a SCell while the WTRU reacquires SI due to a change in SI. For example, if the SI only pertains to the PCell or if the SI is broadcasted only on the PCell. In another example, the SI change may be related to a given item in the configuration (e.g., the configuration for PUCCH of the associated UL CC).

Described herein are scenarios and methods related to resource allocation for the uplink HARQ feedback for downlink transmissions by the WTRU affected by activation and deactivation of SCells.

A WTRU may transmit HARQ feedback for PDSCH transmissions received in any configured and active DL CC on the resources of a single UL CC, (e.g., on the PUCCH of the PCell). The applicable resource allocation may be determined by the first control channel element (CCE) of the PDCCH for the corresponding PDSCH transmission. A WTRU may transmit CQI/PMI/RI for any configured CC on the resources of a single UL CC (e.g., on the PUCCH of the PCell). The applicable resource may be configured by RRC signaling.

In another scenario, the transmission mode for PUCCH signaling in a UL CC (e.g. the PCell UL) carries a fixed amount of information (i.e., the format) given a fixed link budget and the format, for decoding purposes, may be known by the receiver. The WTRU may be configured to transmit HARQ ACK/NACK (A/N) feedback for concurrent PDSCH transmissions in different serving cells and/or CQI/PMI/RI feedback for multiple serving cells. The manner in which the WTRU transmits control information on the PUCCH may be dependent on the number of configured SCells/PDSCHs and/or the number of serving cells for which the WTRU may report CQI/PMI/RI. While it may be possible for the base station to control the WTRU UL activity on the PUCCH in a manner that makes the switch between the WTRU's PUCCH transmission mode to occur in a predictable manner (e.g., by introducing a delay or a silent period for HARQ feedback on the PUCCH between reconfiguration/activation/deactivation of SCells), it may be desirable for the WTRU to follow a clear behavior to avoid any possible uncertainty regarding which format to use for a PUCCH transmission in any given subframe. The need for a clear synchronization point may be especially relevant for the CQI/PMI/RI and the HARQ A/N.

Another aspect of the described methods address how a WTRU configured with at least one SCell, upon detection of a change in the number of configured (alternatively active) SCell DL(s), (i.e., PDSCH), for which it may be reporting HARQ feedback (e.g., on PUCCH) and/or other uplink control information such as CQI/PMI/RI in a single given UL CC, may implicitly change a transmission mode (format) for the UL control signaling either in the subframe from which the reconfiguration is applicable, in the subframe at which the number of the SCell DL(s) has changed, or after an offset amount of time thereof (e.g., after 3 ms processing time).

In another example, the control signaling may contain a configuration of the WTRU, or alternatively an index to said configuration. This may include at least one of the following information. The information may be a PUCCH configuration or an index thereto for at least one of resources (e.g., format and/or location and/or coding) for HARQ A/N and/or resources for CQI/PMI/RI. The information may also be a SRS configuration or an index thereto. The information may also be a SPS configuration or an index thereto, either for UL CC or DL CC or both. The information may also be a radio resource configuration, such as a transmission mode of a CC. For any of the above configuration information, the configuration information may be index to an item in a set of previously configured UL/DL resources.

The information may also be a configuration that may be applicable to at least one of: the SCell UL corresponding to the concerned SCell that is being activated; the PCell UL corresponding to the PCell; or the UL CC or DL CC of another serving cell explicitly indicated in the control signaling.

In another example, the control signaling may contain an indication of whether or not the WTRU may use the PUCCH resources for HARQ feedback in the UL CC corresponding to at least one of: the UL CC being associated with the serving cell in which the control signaling was received; the UL CC corresponds to the PCell; the UL CC being configured (e.g., RRC) for reporting of HARQ feedback for PDSCH transmissions on multiple DL CCs; or a set of PUCCH resources (e.g. format, locations and/or channel coding) configured (e.g., by RRC) for example as an index to an item in a set of configured resources. For example, the WTRU may receive an index to a set of indexes for the purpose of HARQ feedback resource allocation.

For the purpose of selecting which transmission mode the WTRU may use for the transmission of control signaling either on PUCCH or on PUSCH on a UL CC (e.g. the PCell UL), the WTRU may do the following. The WTRU determines if the WTRU is configured to report control signaling such that control information for one or more DL CCs may be included in the same transmission format. The control signaling may be control information for multiple serving cells and may be aggregated in the same transmission format, the control signaling may be HARQ feedback for a PDSCH transmission, or the control signaling may be CQI/PMI/RI feedback. If the WTRU activates or deactivates at least one SCell DL, which activation/deactivation results in a different number of serving cells for which the WTRU reports control signaling in the same transmission format, the WTRU may change transmission mode for any combination of CQI, PMI, and/or RI when reporting on PUSCH and/or on PUCCH (if such resources are configured for the WTRU) in the subframe in which the WTRU received the control signaling for activation/deactivation of the SCell(s) or after a fixed amount of time (e.g., a WTRU processing time such as 4 ms), from the subframe in which the WTRU received the control signaling for activation/deactivation of the SCell(s); or after a fixed amount of time from the subframe in which the WTRU transmitted an acknowledgement of the control signaling.

Described herein are scenarios and methods related to cross-carrier scheduling affected by activation and deactivation of SCells.

When a WTRU may be scheduled (either UL grants or DL assignments) on multiple serving cells, the WTRU may either be configured to monitor PDCCH in each of the configured DL CCs, or it may be configured for cross-carrier scheduling.

Another aspect of the described methods address how a WTRU configured with at least one SCell, upon SCell activation, may determine whether or not cross-carrier scheduling may be used for that SCell and/or whether it may activate additional SCells for that purpose.

In another example, the control signaling may contain an indication in the control signaling applicable to a CC, whether or not the WTRU may decode the PDCCH in a DL CC used for cross-carrier scheduling of radio resources for said CC. This may include an identity of the DL CC used for cross-carrier scheduling of said CC.

In another example, the control signaling may contain an indication in the control signaling applicable to a DL CC, whether or not cross-carrier signaling is applicable for the PDCCH of the DL CC. This may include an explicit indication and/or identity of which WTRU-specific SS(s) the WTRU may decode the PDCCH for DL assignments ("PD-CCH SSID"). In particular, this may include an index to an item of a WTRU-specific SS configuration, and/or a parameter to derive the starting location of the WTRU-specific SS such as the number of CCEs for the search space (SS) or a virtual identifier to use instead of the WTRU ID used to derive a PDCCH candidate in the SS.

In another example, the control signaling may contain an indication in the control signaling applicable to a UL CC, whether or not cross-carrier signaling is applicable for the PUSCH of the UL CC. This may include explicit indication and/or identity of which DL CC(s) may provide scheduling control information (i.e., PDCCH) for the CC. It may include an explicit indication and/or identity of which WTRU-specific SS the WTRU may decode the PDCCH for UL grants ("PDCCH SSID"). In particular, it may include an index to an item of a WTRU-specific SS configuration and/or a parameter to derive the starting location of the WTRU-specific SS such as the number of CCEs for the SS or an virtual identifier to use instead of the WTRU ID used to derive a PDCCH candidate in the SS.

In another example, the WTRU may receive in the RRC control signaling that configures the concerned SCell and/or that configures the WTRU for cross-carrier scheduling, an indication of whether the concerned SCell is scheduled by the PDCCH on said concerned SCell or not, and if not possibly also which serving cell signals the downlink and uplink grants, if uplink resources are configured, for the concerned SCell.

The applicability of the methods described herein may depend on the state of the WTRU and/or base station. For example, method applicability may depend on: whether or not the TAT applicable to the serving cell is running; whether or not the SCell UL has different TA requirements than at least one other UL CC configured for the WTRU; whether or not dedicated resources (e.g., SPS, PUCCH, SRS) are configured for the SCell UL; whether or not dedicated resources (e.g., SPS) are configured for a DL CC associated with the UL CC; the association between one or more DL CC(s) with the UL CC, e.g., via mapping for HARQ feedback; whether or not the power headroom reporting function is configured for the UL CC; and whether or not the HARQ process has data left in is its buffer (i.e., HARQ has not yet completed the transmission of the transport block in its buffer). The examples described herein are generally applicable independently of whether or not DRX is configured and/or applicable for the CC.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method implemented at a wireless transmit/receive unit (WTRU) for handling carrier aggregation, comprising:
establishing a connection with a primary cell (PCell);
configuring the WTRU with a secondary cell (SCell);
receiving an activation/deactivation medium access control (MAC) control element (CE) comprising fields for signaling activation/deactivation states for multiple SCells;
determining an activation/deactivation state for the SCell using an identity of SCell as an index to the activation/deactivation MAC CE;
activating or deactivating the SCell based on the determined activation/deactivation state; and
triggering a power headroom report responsive to activation of the SCell and on a condition that the SCell is configured for uplink transmission.

2. The method of claim 1, wherein the SCell is activated on condition that the determined activation/deactivation state commands an activation of the SCell.

3. The method of claim 1, wherein the SCell is deactivated on condition that the determined activation/deactivation state commands a deactivation of the SCell.

4. The method of claim 1, further comprising:
on a condition that the SCell is configured for reception of a physical downlink control channel, starting a monitoring of the physical downlink control channel responsive to activation of the SCell.

5. The method of claim 1, further comprising:
receiving a cross-carrier scheduling configuration; and
determining, from the cross-carrier scheduling configuration, a starting symbol of a physical downlink shared channel for the SCell.

6. The method of claim 1, further comprising:
responsive to deactivation of the SCell,
stopping a monitoring of a physical downlink control channel for the SCell; and
stopping receiving downlink assignments or uplink grants associated with the SCell.

7. The method of claim 1, further comprising:
receiving a cross-carrier scheduling configuration; and
determining, based on the cross-carrier scheduling configuration, a serving cell for receiving downlink allocations or uplink grants for the SCell.

8. The method of claim 1, further comprising:
responsive to deactivation of the SCell, stopping a reporting of a channel quality indicator, a precoding matrix index, or a rank indication for the SCell.

9. The method of claim 1, further comprising:
responsive to deactivation of the SCell, releasing a sounding reference signal reporting configuration for the SCell.

10. The method of claim 1, further comprising:
releasing a configuration for the SCell responsive to an indication of a radio resource controller connection re-establishment.

11. A wireless transmit/receive unit (WTRU) configured for carrier aggregation, comprising:
a transceiver; and
a processor in communication with the transceiver, wherein the processor is configured to:
establish a connection with a primary cell (PCell);
configure the WTRU with a secondary cell (SCell);
receive an activation/deactivation medium access control (MAC) control element (CE) comprising fields for signaling activation/deactivation states for multiple SCells;
determine an activation/deactivation state for the SCell using an identity of the SCell as an index to the activation/deactivation MAC CE;
activate or deactivate the SCell based on the determined activation/deactivation state; and
trigger a power headroom report responsive to activation of the SCell and on a condition that the SCell is configured for uplink transmission.

12. The WTRU of claim 11, wherein the SCell is activated on condition that the determined activation/deactivation state commands an activation of the SCell.

13. The WTRU of claim 11, wherein the SCell is deactivated on condition that the determined activation/deactivation state commands a deactivation of the SCell.

14. The WTRU of claim 11, wherein the processor is further configured to:
on a condition that the SCell is configured for reception of a physical downlink control channel, start a monitoring of the physical downlink control channel responsive to activation the SCell.

15. The WTRU of claim 11, wherein the processor is further configured to:
receive a cross-carrier scheduling configuration; and
determine, from the cross-carrier scheduling configuration, a starting symbol of a physical downlink shared channel for the SCell.

16. The WTRU of claim 11, wherein the processor is further configured to:
responsive to deactivation of the SCell,
stop a monitoring of a physical downlink control channel for the SCell; and
stop receiving downlink assignments or uplink grants associated with the SCell.

17. The WTRU of claim 11, wherein the processor is further configured to:
receive a cross-carrier scheduling configuration; and
determine, based on the cross-carrier scheduling configuration, a serving cell for receiving downlink allocations or uplink grants for the SCell.

18. The WTRU of claim 11, wherein the processor is further configured to:
responsive to deactivation the SCell, stop a reporting of a channel quality indicator, a precoding matrix index, or a rank indication for the SCell.

19. The WTRU of claim 11, wherein the processor is further configured to:
responsive to deactivation of the SCell, release a sounding reference signal reporting configuration for the SCell.

20. The WTRU of claim 11, wherein the processor is further configured to:
release a configuration for the SCell responsive to an indication of a radio resource controller connection re-establishment.

21. The method of claim 1, wherein the connection comprises a radio resource configuration (RRC) connection, the method further comprising:
receiving an RRC reconfiguration message including configuration information for associating the SCell to the RRC connection.

22. The WTRU of claim 11, wherein the connection comprises a radio resource configuration (RRC) connection, and wherein the processor is further configured to:
receive an RRC reconfiguration message including configuration information for associating the SCell to the RRC connection.

23. The method of claim 1, wherein the activation/deactivation MAC CE includes a bitmap, wherein each bit in the bitmap corresponds to, and indicates the activation/deactivation state of, one of the multiple SCells.

24. The method of claims 1, wherein the SCell is initially configured in a deactivated state.

25. The method of claim 1, wherein the SCell is configured using an SCell configuration received via dedicated signaling, and wherein the SCell configuration comprises the identity of the SCell and a radio resource configuration that identifies configuration parameters for downlink (DL) and uplink (UL) resources of the SCell.

26. The method of claim 1, wherein a deactivation timer is started or restarted responsive to the activation/deactivation MAC CE signaling activation of the SCell.

27. The method of claim 26, wherein the activation/deactivation MAC CE is received prior to expiry of the deactivation timer.

28. The WTRU of claim 11, wherein the activation/deactivation MAC CE includes a bitmap, wherein each bit in the bitmap corresponds to, and indicates the activation/deactivation state of, one of the multiple SCells.

29. The WTRU of claim 11, wherein the SCell is initially configured in a deactivated state.

30. The WTRU of claim 11, wherein the SCell is configured using an SCell configuration received via dedicated signaling, and wherein the SCell configuration comprises the identity of the SCell and a radio resource configuration that identifies configuration parameters for downlink (DL) and uplink (UL) resources of the SCell.

31. The WTRU of claim 11, wherein a deactivation timer is started or restarted responsive to the activation/deactivation MAC CE signaling activation of the SCell.

32. The WTRU of claim 31, wherein the activation/deactivation MAC CE is received prior to expiry of the deactivation timer.

* * * * *

UNITED STATES PATENT AND TRADEMARK OFFICE
CERTIFICATE OF CORRECTION

PATENT NO. : 9,491,793 B2
APPLICATION NO. : 14/522801
DATED : November 8, 2016
INVENTOR(S) : Ghyslain Pelletier et al.

It is certified that error appears in the above-identified patent and that said Letters Patent is hereby corrected as shown below:

On the Title Page

In the bibliography, at page 2, second column, under OTHER PUBLICATIONS,

"3rd Generation Partnership Project; Technical Specification Group Radio Access Network; Evolved Universal Terrestrial Radio Access (E-UTRA); Multiplexing and Channel Coding (Release 9)", 36.213 V9.3.0, Sep. 2010, 80 pages."
Should be:
--"3rd Generation Partnership Project; Technical Specification Group Radio Access Network; Evolved Universal Terrestrial Radio Access (E-UTRA); Physical Layer Procedures (Release 9)", 3GPP TS 36.213 V9.3.0, Sep. 2010, 80 pages.--

"Interdigital Communications, "Editorial proposals to the CA RRC CR", 3GPP Tdoc Tdoc R2-105707, 3GPP TSG-RAN WG2 #71bis, Xian, Peoples Republic of China, Oct. 11-15, 2010, 12 pages."
Should be:
--Interdigital Communications, "Editorial proposals to the CA RRC CR", 3GPP Tdoc R2-105707, 3GPP TSG-RAN WG2 #71bis, Xian, Peoples Republic of China, Oct. 11-15, 2010, 12 pages.-- at page 3, first column, under OTHER PUBLICATIONS,

"Interdigital Communications, "Explicit Uplink SCC Deactivation in LTE CA", 3GPP Tdoc Tdoc R2-104816, 3GPP TSG-RAN WG2 #71, Madrid, Spain, Aug. 23-27, 2010, 4 pages."
Should be:
--Interdigital Communications, "Explicit Uplink SCC Deactivation in LTE CA", 3GPP Tdoc R2-104816, 3GPP TSG-RAN WG2 #71, Madrid, Spain, Aug. 23-27, 2010, 4 pages.--

Signed and Sealed this
Twenty-third Day of May, 2017

Michelle K. Lee
*Director of the United States Patent and Trademark Office*

CERTIFICATE OF CORRECTION (continued)
U.S. Pat. No. 9,491,793 B2

"Interdigital Communications, "Report of e-mail discussion [71#56] Enabling/Disabling of UL functionality", 3GPP Tdoc Tdoc R2-105703, 3GPP TSG-RAN WG2 Meeting #71bis, Xian, China, Oct. 11-15, 2010, 16 pages."
Should be:
--Interdigital Communications, "Report of e-mail discussion [71#56] Enabling/Disabling of UL functionality", 3GPP Tdoc R2-105703, 3GPP TSG-RAN WG2 Meeting #71bis, Xian, China, Oct. 11-15, 2010, 16 pages.-- at page 3, first column, under OTHER PUBLICATIONS,

"Interdigital Communications, "UE Actions TAT Expiration with LTE CA", 3GPP Tdoc R2-103774, 3GPP TSG-RANWG2 #7bis, Stockholm, Sweden, Jun. 28-Jul. 2, 2010, 4 pages."
Should be:
--Interdigital Communications, "UE Actions TAT Expiration with LTE CA", 3GPP Tdoc R2-103774, 3GPP TSG-RANWG2 #70bis, Stockholm, Sweden, Jun. 28-Jul. 2, 2010, 4 pages.-- at page 3, second column, under OTHER PUBLICATIONS,

"3rd Generation Partnership Project Technical Specification; LTE; Evolved Universal Terrestrial Radio Access (E-UTRA); Multiplexing and Channel Coding (Release 9)", 3GPP TS 36.212 V9.3.0, Oct. 2010, 63 pages."
Should be:
--"3rd Generation Partnership Project; Technical Specification Group Radio Access Network; Evolved Universal Terrestrial Radio Access (E-UTRA); Multiplexing and Channel Coding (Release 9), 3GPP TS 36.212 V9.3.0, Sep 2010, 61 pages.--

In the Specification

At Column 20, Line 40, "PUSCH" should be --PUCCH--

In the Claims

In Claim 14, at Column 36, Line 20, "activation the SCell" should be --activation of the SCell--

In Claim 18, at Column 36, Line 42, "deactivation the SCell" should be --deactivation of the SCell--